(12) United States Patent
Li et al.

(10) Patent No.: US 12,507,738 B2
(45) Date of Patent: Dec. 30, 2025

(54) ELECTRONIC CIGARETTE STEM AND AN ELECTRONIC CIGARETTE

(71) Applicant: Luxshare Precision Industry Company Limited, Shenzhen (CN)

(72) Inventors: Huabing Li, Shenzhen (CN); Yu Huang, Shenzhen (CN); Zhongyuan Lai, Shenzhen (CN); Lei He, Shenzhen (CN)

(73) Assignee: Luxshare Precision Industry Company Limited, Shenzhen (CN)

(*) Notice: Subject to any disclaimer, the term of this patent is extended or adjusted under 35 U.S.C. 154(b) by 426 days.

(21) Appl. No.: 17/870,197

(22) Filed: Jul. 21, 2022

(65) Prior Publication Data

US 2023/0329348 A1 Oct. 19, 2023

(30) Foreign Application Priority Data

Apr. 18, 2022 (CN) .......................... 202210404256.3

(51) Int. Cl.
*A24F 40/485* (2020.01)
*A24F 40/90* (2020.01)
(Continued)

(52) U.S. Cl.
CPC ............ *A24F 40/485* (2020.01); *A24F 40/90* (2020.01); *H01M 50/202* (2021.01);
(Continued)

(58) Field of Classification Search
None
See application file for complete search history.

(56) References Cited

U.S. PATENT DOCUMENTS

| 10,813,386 B1 | 10/2020 | Bajpai et al. |
| 2015/0184846 A1 | 7/2015 | Liu |

(Continued)

FOREIGN PATENT DOCUMENTS

| CN | 206079038 U | 4/2017 |
| CN | 107394430 A | 11/2017 |

(Continued)

OTHER PUBLICATIONS

English machine translation of CN 206079038 U; Wang; Apr. 12, 2017; 12 pages. (Year: 2017).*

(Continued)

*Primary Examiner* — Linda L Gray
(74) *Attorney, Agent, or Firm* — IPro, PLLC

(57) ABSTRACT

The embodiments of the present disclosure provides an electronic cigarette and an electronic cigarette stem comprising a battery box, a bottom cover and a charging connection module. The battery box forms a first accommodating cavity, and both ends of it are respectively provided with an air outlet and a first through hole. The bottom cover and the battery box form a second accommodating cavity. The charging connection module is in the second accommodating cavity; an output terminal is arranged in the first accommodating cavity through the first through hole; an input terminal is connected to an external power supply through an air inlet. The air inlet, the second accommodating cavity, the first through hole, the first accommodating cavity and the air outlet form an airflow channel connecting an atomizer. Using the air inlet for both air admission and charging can simplify structure, improve production efficiency and reduce production cost.

19 Claims, 22 Drawing Sheets

(51) Int. Cl.
*H01M 50/202* (2021.01)
*H01M 50/247* (2021.01)
*H01M 50/262* (2021.01)
*H01M 50/271* (2021.01)
*H01M 50/284* (2021.01)
*H01M 50/296* (2021.01)
*H01M 50/559* (2021.01)

(52) U.S. Cl.
CPC ....... *H01M 50/247* (2021.01); *H01M 50/262* (2021.01); *H01M 50/271* (2021.01); *H01M 50/284* (2021.01); *H01M 50/296* (2021.01); *H01M 50/559* (2021.01); *H01M 2220/30* (2013.01)

(56) References Cited

U.S. PATENT DOCUMENTS

| | | | |
|---|---|---|---|
| 2016/0345625 | A1 | 12/2016 | Liu |
| 2018/0070638 | A1 | 3/2018 | Qiu |
| 2020/0178616 | A1* | 6/2020 | Yu .......................... A24F 40/53 |

FOREIGN PATENT DOCUMENTS

| | | |
|---|---|---|
| CN | 207855020 U | 9/2018 |
| CN | 109805460 A | 5/2019 |
| CN | 110074460 A | 8/2019 |
| CN | 209498573 U | 10/2019 |
| CN | 110558621 A | 12/2019 |
| CN | 111820465 A | 10/2020 |
| CN | 214481198 U | 10/2021 |
| CN | 214483258 U | 10/2021 |
| CN | 214677589 U | 11/2021 |
| CN | 114176270 A | 3/2022 |
| CN | 114190592 A | 3/2022 |
| CN | 114223946 A | 3/2022 |
| CN | 216088879 U | 3/2022 |
| JP | 3210447 U | 5/2017 |
| WO | 2019232086 A1 | 12/2019 |
| WO | 2020182068 A1 | 9/2020 |
| WO | 2021121242 A1 | 6/2021 |

OTHER PUBLICATIONS

CN 202210404250.6 first OA and search report dated Jan. 6, 2025.
CN 202210404256.3 Notification to Grant Patent Right for Invention and search report dated Mar. 25, 2025.

* cited by examiner

ELECTRONIC CIGARETTE STEM AND AN ELECTRONIC CIGARETTE

FIELD OF THE INVENTION

The present disclosure relates to the technical field of electronic cigarette accessories, in particular to an electronic cigarette stem and an electronic cigarette.

BACKGROUND OF THE INVENTION

Currently, more and more smokers choose electronic cigarettes, instead of traditional cigarettes. Electronic cigarettes atomize tar by electric heating, so that smokers can smoke the atomized tar to achieve the purpose of smoking. The existing electronic cigarette stem needs another air vent or other ventilation structures, so its structure is relatively complex, which will also affect the production efficiency and improve the production cost.

SUMMARY OF THE INVENTION

The present disclosure aims to provide an electronic cigarette stem and an electronic cigarette, which can simplify the structure of the electronic cigarette stem by multiplexing a port as an air inlet and a charging port.

In a first aspect, the embodiments of the present disclosure provide an electronic cigarette stem, wherein the electronic cigarette stem comprises:
  a battery box, wherein a first accommodating cavity is formed inside the battery box, and a first end of the battery box is provided with an air outlet communicated with the first accommodating cavity, and a second end of the battery box is provided with a first through hole communicated with the first accommodating cavity;
  a bottom cover, wherein the bottom cover comprises a bottom plate and a side wall extending from an edge of the bottom plate towards the battery box, and the bottom plate is provided with an air inlet, and the bottom cover is connected with the second end of the battery box through the side wall to form a second accommodating cavity in coordination with the battery box; and
  a charging connection module is arranged in the second accommodating cavity, and an output terminal of the charging connection module extends into the first accommodating cavity through the first through hole, and an input terminal of the charging connection module is configured to communicate an external power supply through the air inlet, wherein an outer circumferential side of the input terminal is partly or entirely spaced from an inside wall of the air inlet;
  and wherein the first end of the battery box is used for being connected to an atomizer, and the air inlet, the second accommodating cavity, the first through hole, the first accommodating cavity and the air outlet form an airflow channel communicating the atomizer.

Further, the electronic cigarette stem comprises:
  a battery arranged in the first accommodating cavity;
  and wherein the output terminal of the charging connection module is connected with the battery through the first through hole.

Further, one end of the battery facing the bottom cover is provided with a tab extending therefrom, and an electrode is arranged on the tab;
  the output terminal of the charging connection module is connected with the electrode through the first through hole.

Further, the first through hole extends from an edge towards the first end of the battery box to form a supporting portion;
  the output terminal and the tab are stacked on the supporting portion.

Further, the battery box comprises:
  a battery box body, wherein there is an opening at a side of the battery box body; and
  a battery cover, wherein the battery cover is matched with the opening, and a pressing portion is arranged on a side of the battery cover facing the battery, and the battery cover is configured to close the first accommodating cavity and presses the tab and the output terminal on the supporting portion through the pressing portion.

Further, the battery box body is provided with a buckle ring;
  the battery cover is provided with a first buckle mutually matched with the buckle ring, and the battery cover is fixedly connected with the battery box body through the first buckle and the buckle ring.

Further, the battery cover comprises a cover body and a pressing member, and the cover body is mutually matched with the opening on the side of the battery box body and is configured to close the first accommodating cavity, and an abutting portion is arranged on a side of the pressing member facing the battery, and the abutting portion is configured to press the tab and the output terminal on the supporting portion.

Further, the electronic cigarette stem comprises:
  power supply terminals, wherein each of the power supply terminals protrudes from the first end of the battery box, and each of the power supply terminals is used for supplying the electric energy stored in the battery to the atomizer; and
  electrical connectors, wherein both ends of the electrical connector are respectively connected with the respective power supply terminal and the charging connection module.

Further, each of the electrical connectors is arranged as a metal sheet.

Further, the first end of the battery box is provided with second through holes, and each of the power supply terminals protrudes from the first end of the battery box through the respective second through hole;
  each of the second through holes extends from an edge in a direction away from the bottom cover to form a terminal channel;
  the air outlet extends from an edge in a direction away from the bottom cover to form an outlet channel.

Further, the first end of the battery box bulges in a direction away from the bottom cover to form an annular limiting portion, and the limiting portion is arranged around the terminal channel and the outlet channel;
  and wherein the electronic cigarette stem further comprises:
  a tar-absorbing cotton, wherein the tar-absorbing cotton is arranged inside the limiting portion and provided with an avoiding structure;
  the terminal channel and the outlet channel pass through the tar-absorbing cotton through the avoiding structure.

Further, the electronic cigarette stem comprises:
  leak-proof plugs arranged at an end of each of the electrical connectors close to the bottom cover;

and wherein the second end of the battery box is provided with third through holes, and each of the electrical connectors is connected with the charging connection module through the respective third through hole, and each of the leak-proof plugs is used for plugging the respective third through hole.

Further, the bottom plate extends towards the battery box from an edge of the air inlet to form an inlet channel;
the input terminal is located in the inlet channel.

Further, the input terminal is configured to comply with a scheduled charging protocol;
the inlet channel is formed as a charging port that matches the scheduled charging protocol.

Further, the charging connection module comprises:
a circuit board arranged in the second accommodating cavity;
and wherein the input terminal and the output terminal are arranged on the circuit board.

Further, the circuit board is sunken from edges to form clamping grooves;
the second end of the battery box is provided with a second buckle, and the second buckle fixes the circuit board through the clamping groove.

Further, a buckle hole is arranged on a side wall of the bottom cover;
the second end of the battery box is provided with a third buckle, and the third buckle fixes the bottom cover through the buckle hole.

Further, the electronic cigarette stem comprises:
an outer shell, wherein the outer shell is arranged in a tubular structure and sleeved on the battery box, and a first end of the outer shell extends out of the battery box to form an accommodating space, and the accommodating space is used for being connected to the atomizer.

Further, the side of the battery box is provided with an annular groove along the circumferential direction;
and wherein the electronic cigarette stem further comprises:
a sealing ring, wherein the sealing ring is sleeved in the annular groove and abuts against an inner wall of the outer shell.

Further, a bottom plate size of the bottom cover is larger than an inner size of the outer shell, and a side wall size of the bottom cover is smaller than the inner size of the outer shell.

Further, part of the side wall of the bottom cover bulges to form a contact portion, and the side wall contacts the inner wall of the outer shell through the contact portion.

In a second aspect, the embodiments of the present disclosure further provide an electronic cigarette, wherein the electronic cigarette comprises:
the electronic cigarette stem in the first aspect; and
the atomizer configured to be connected to the electronic cigarette stem.

Provided by the embodiments of the present disclosure is an electronic cigarette stem and an electronic cigarette, wherein the electronic cigarette stem comprises a battery box, a bottom cover and a charging connection module. A first accommodating cavity is formed inside the battery box, and both ends of the battery box are respectively provided with an air outlet and a first through hole. The bottom cover comprises a bottom plate and a side wall, and forms a second accommodating cavity in coordination with the battery box. The charging connection module is arranged in the second accommodating cavity, and an output terminal is arranged in the first accommodating cavity through the first through hole, and an input terminal is configured to be connected to an external power supply through an air inlet. The air inlet, the second accommodating cavity, the first through hole, the first accommodating cavity and the air outlet thereby form an airflow channel in communication with an atomizer. In addition, using the air inlet for both air admission and charging can simplify a structure of the electronic cigarette stem, which helps to improve the production efficiency and reduce the production cost.

BRIEF DESCRIPTION OF THE DRAWINGS

The above and other purposes, features and advantages of the present disclosure will become apparent from the following description of embodiments of the present disclosure with reference to the drawings. In the drawings.

DRAWING NOTES

1—Battery box; 11—Air outlet; 111—Outlet channel; 12—First through hole; 121—Supporting portion; 13—Battery box body; 131—Buckle ring; 132—Slot; 14—Battery cover; 141—Pressing portion; 142—First buckle; 14a—Cover body; 14b—Pressing member; 14c—Abutting portion; 15—Second through hole; 151—Terminal channel; 16—Limiting portion; 17—Third through hole; 18—Second buckle; 19—Third buckle; 110—Annular groove;
2—Bottom cover; 21—Bottom plate; 22—Side wall; 221—Contact portion; 23—Air inlet; 231—Inlet channel; 24—Buckle hole;
3—Charging connection module; 31—Output terminal; 32—Input terminal; 33—Circuit board; 331—Clamping groove;
4—Battery; 41—Tab;
5—Power supply terminal;
6—Electrical connector;
7—Tar-absorbing cotton; 71—Avoiding structure;
8—Leak-proof plug;
9—Outer shell;
10—Sealing ring;
a—First accommodating chamber; b—Second accommodating cavity; c—accommodating space;
A—Atomizer; A1—Terminal; A2—Atomizing core; B—Electronic cigarette stem.

PREFERRED EMBODIMENTS OF THE PRESENT INVENTION

The present disclosure is described below based on embodiments but not limited to these embodiments. In the following detailed description of the present disclosure, some specific portions are described in detail. The present disclosure will be fully understood by those skilled in the art without the description of these portions. In order to avoid confusion about the essence of the present disclosure, well-known methods, processes, flows, elements and circuits are not described in detail.

Furthermore, it will be understood by those of ordinary skill in the art that the drawings provided herein are for purposes of illustration and are not necessarily drawn to scale.

Unless required expressly in the context, the words "comprise", "comprising" and the like in the specification shall be construed as including rather than as exclusive or exhaustive; that is to say, it means "including but not limited to".

It shall be understood that, in the present disclosure, the words "first" and "second" are used only for description, and cannot be understood as indication or implying of relative importance. Furthermore, in the description of the present disclosure, "a plurality of" means two or more, unless otherwise stated.

Figure 1:
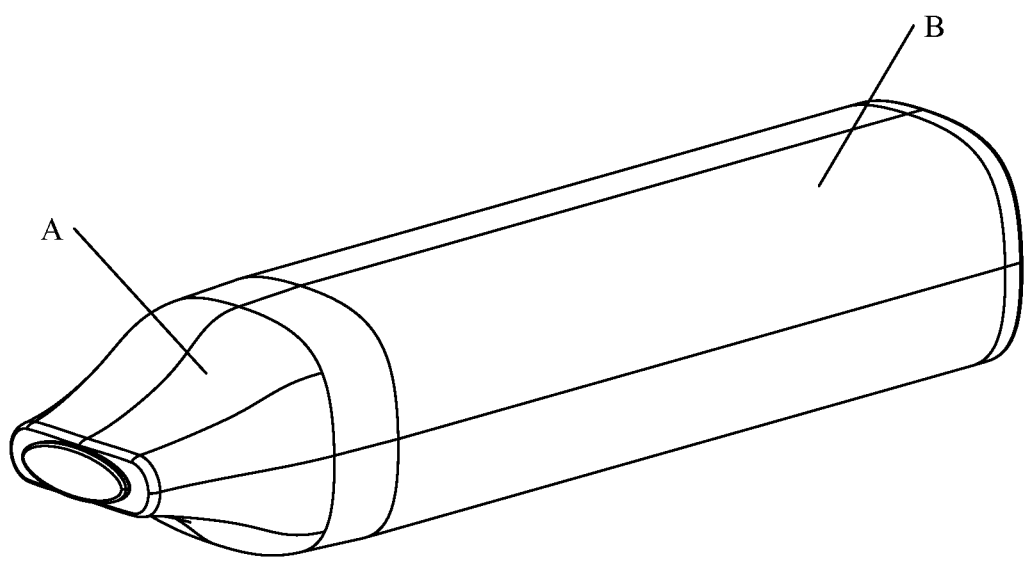
FIG. 1 is a structural diagram of an electronic cigarette according to embodiments of the present disclosure.
Figure 2:
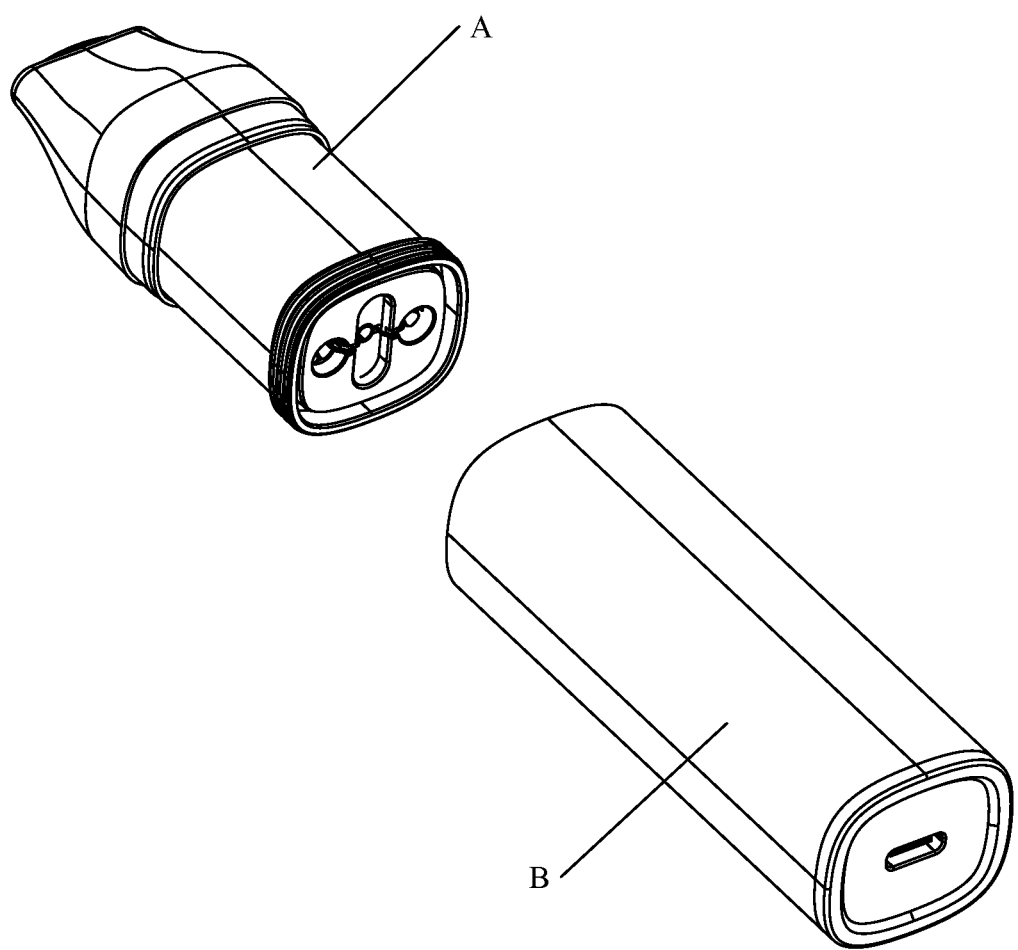
FIG. 2 is a splitting diagram of the electronic cigarette according to embodiments of the present disclosure.
Figure 3:
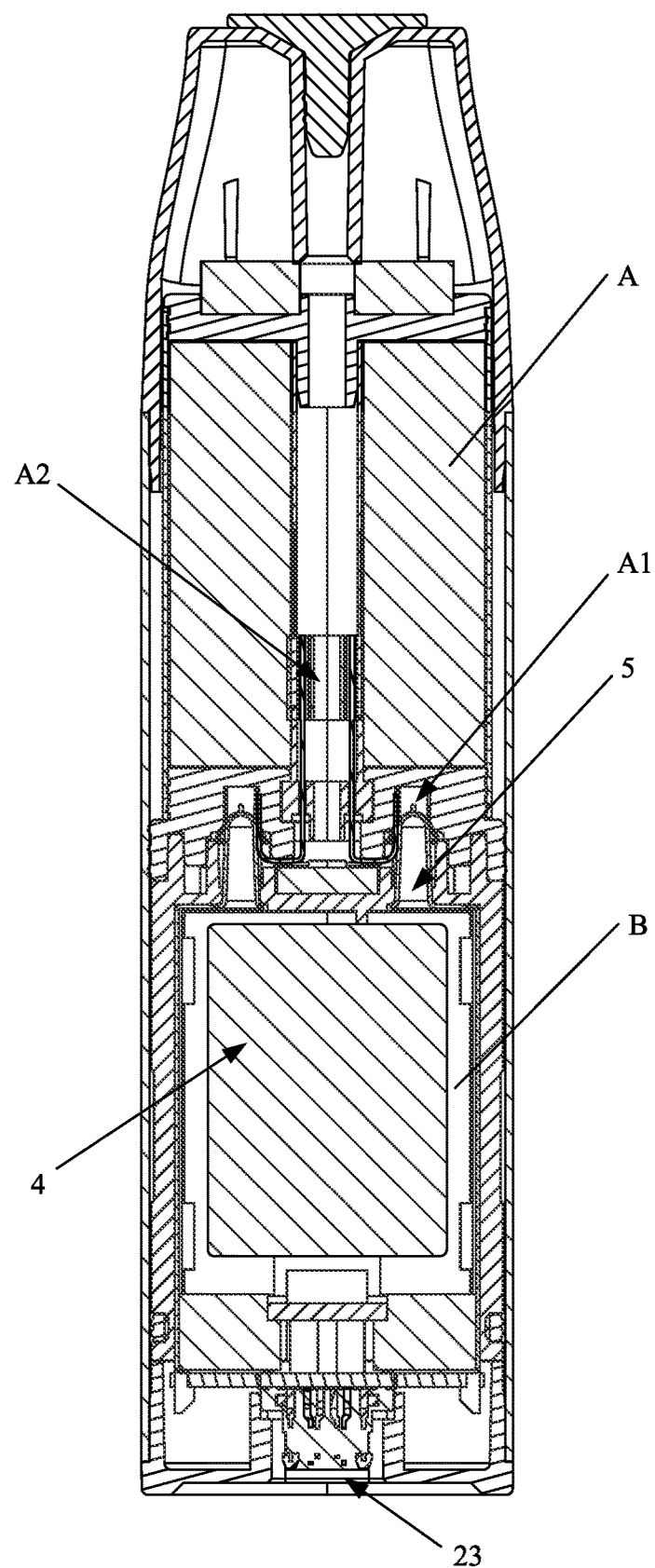
FIG. 3 is a sectional diagram of the electronic cigarette according to embodiments of the present disclosure.

FIG. 1 is an assembly diagram of an electronic cigarette according to embodiments of the present disclosure; FIG. 2 is a splitting diagram of the electronic cigarette according to embodiments of the present disclosure; FIG. 3 is a sectional diagram of the electronic cigarette according to embodiments of the present disclosure; as shown in FIGS. 1 to 3, the electronic cigarette according to this embodiment comprises an electronic cigarette stem B and a detachable atomizer A mounted on the electronic cigarette stem B. It is easy to understand that the atomizer A is a storage module of tar. When the electronic cigarette operates, the electronic cigarette stem B provides electric energy for the atomizer A, so that the tar in the atomizer A can be heated and atomized to be sucked by users.

Figure 4:
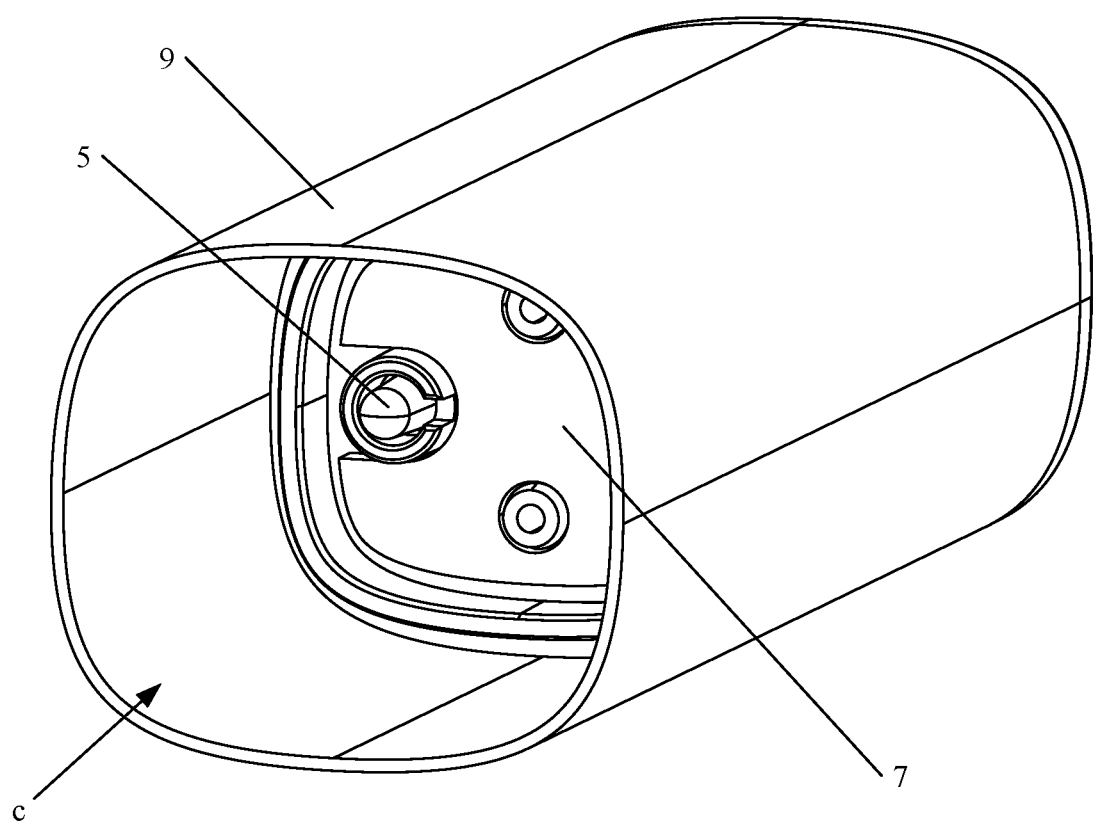
FIG. 4 is a structural diagram of an electronic cigarette stem according to embodiments of the present disclosure.
Figure 5:
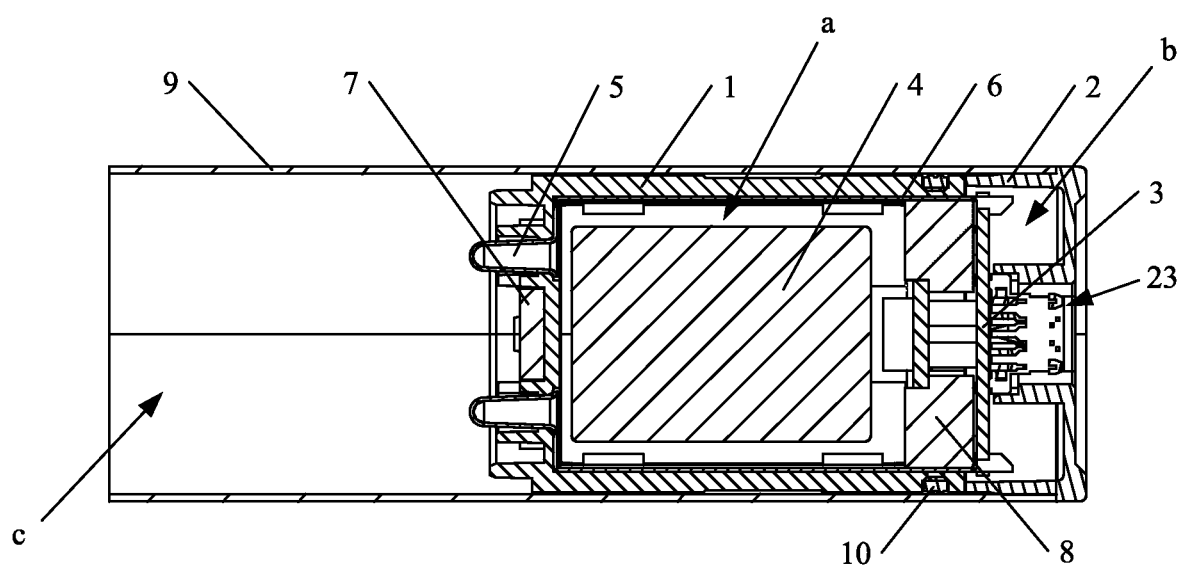
FIG. 5 is a sectional diagram of the electronic cigarette stem according to embodiments of the present disclosure.
Figure 6:
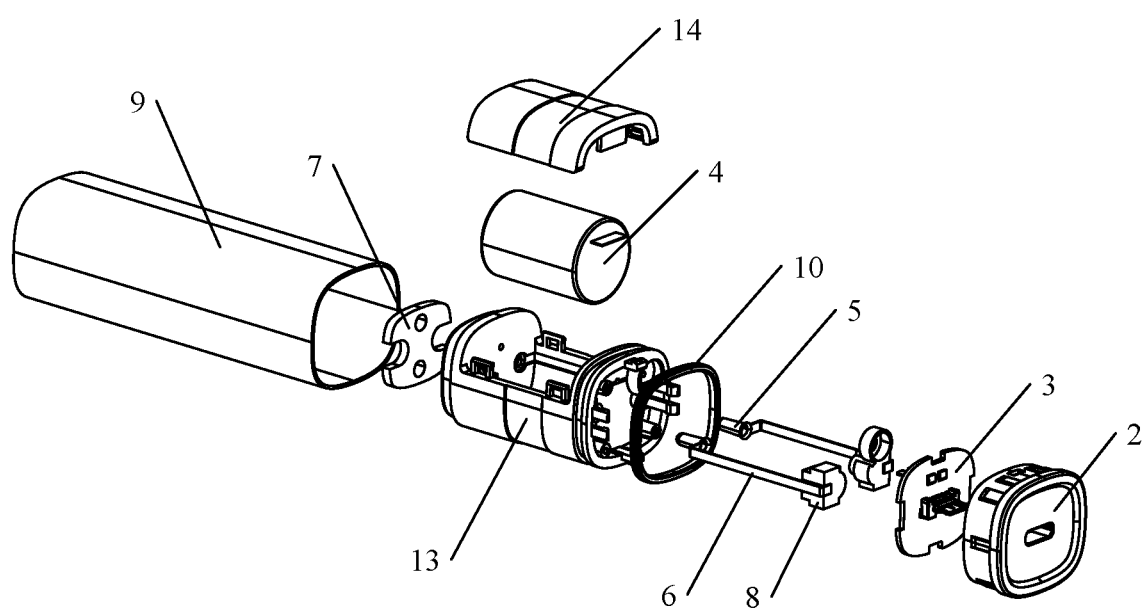
FIG. 6 is an explosion diagram of the electronic cigarette stem according to embodiments of the present disclosure.
Figure 7:
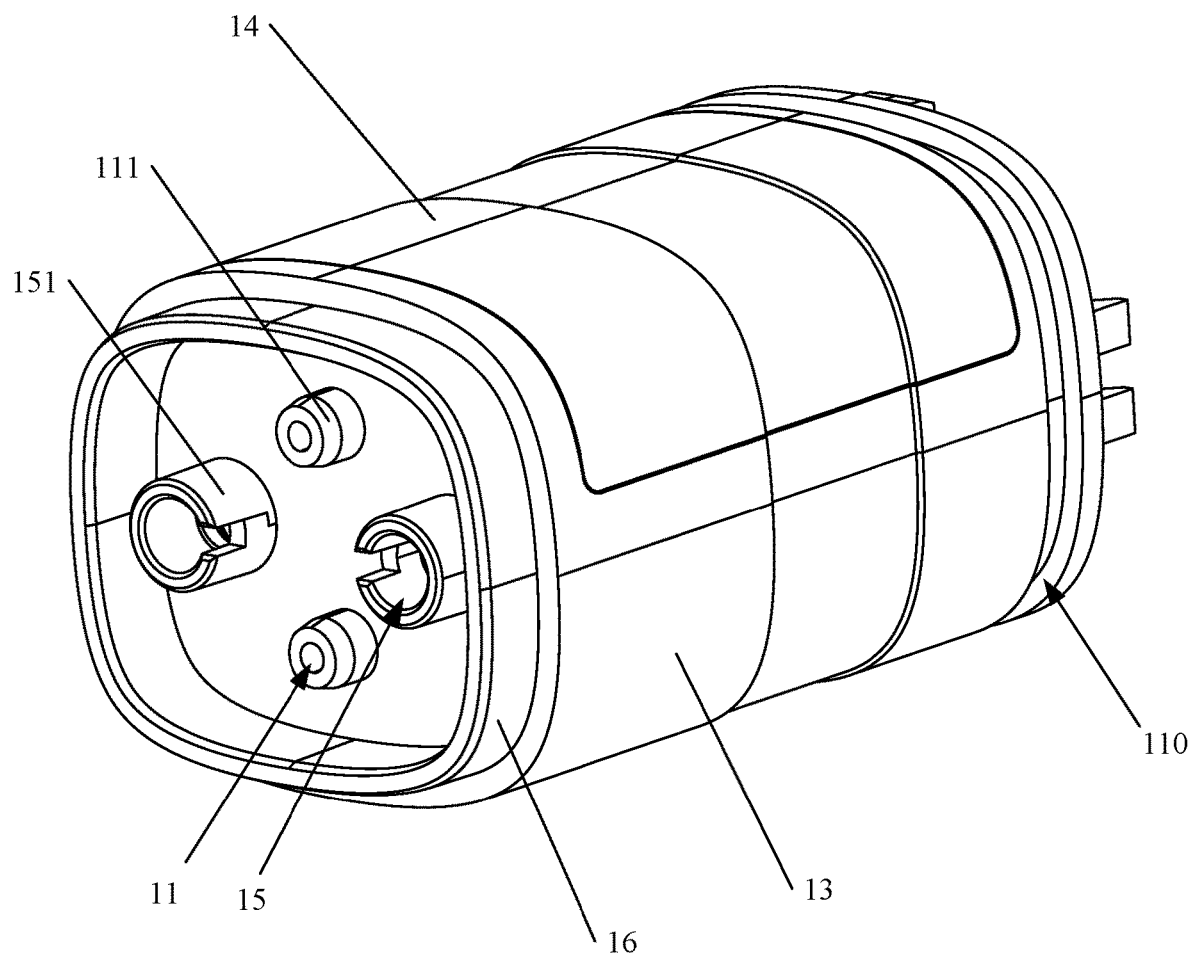
FIG. 7 is a structural diagram of a battery box according to embodiments of the present disclosure.
Figure 8:
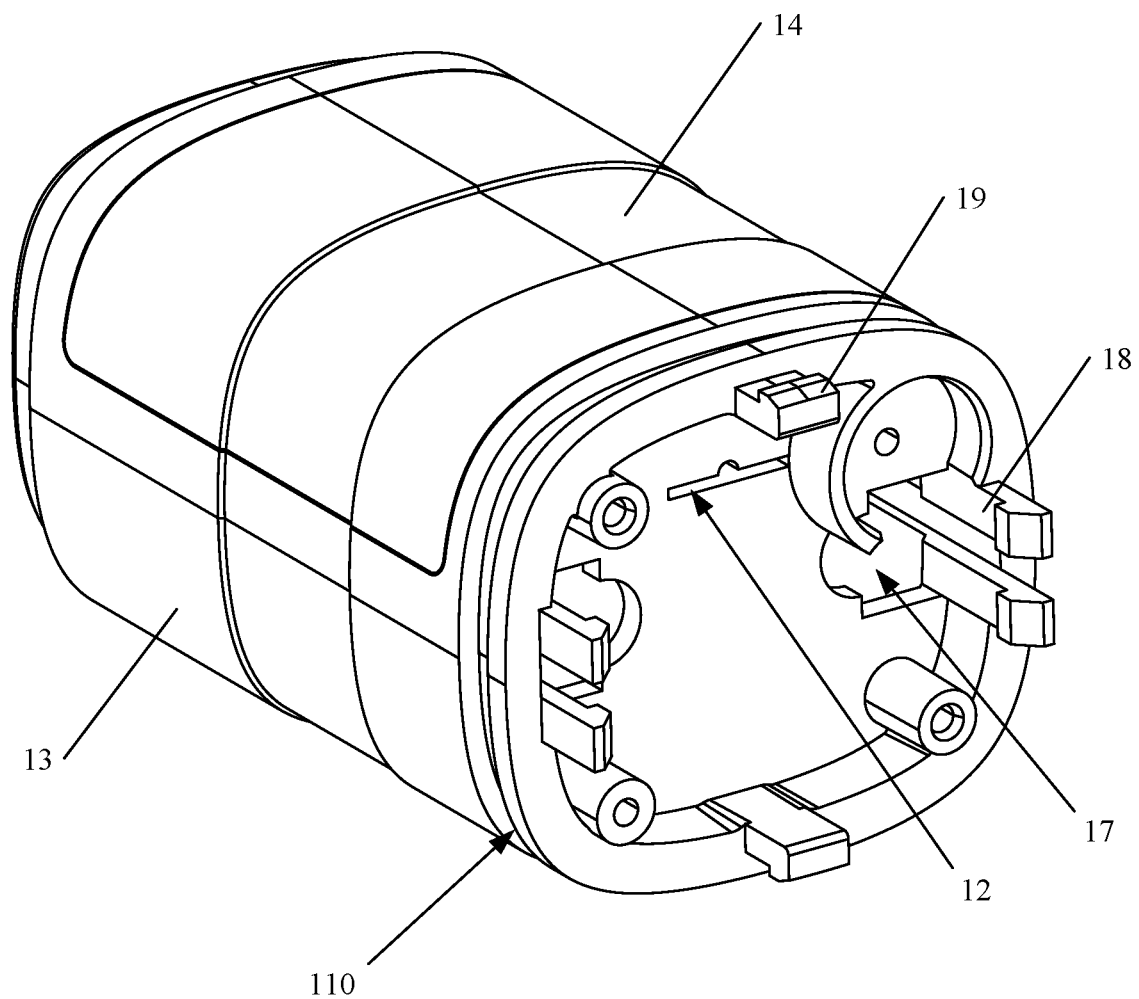
FIG. 8 is a structural diagram of the battery box from another angle of view according to embodiments of the present disclosure.

FIG. 4 is a structural diagram of the electronic cigarette stem B according to embodiments of the present disclosure; FIG. 5 is a sectional diagram of the electronic cigarette stem B according to embodiments of the present disclosure; FIG. 6 is an explosion diagram of the electronic cigarette stem B according to embodiments of the present disclosure; as shown in FIGS. 4 to 6, the electronic cigarette stem B comprises a battery box 1, a bottom cover 2 and a charging connection module 3. As shown in FIGS. 7 to 8, a first accommodating cavity a is formed inside the battery box 1. It is easy to understand that the first accommodating cavity a is used to place the battery that supplies power to the atomizer A. Meanwhile, a first end of the battery box 1 is provided with an air outlet 11 communicated with the first accommodating cavity a, and a second end of the battery box 1 is provided with a first through hole 12 communicated with the first accommodating cavity a. In this way, air enters the first accommodating cavity a from the first through hole 12 and is then discharged through the air outlet 11. In an optional embodiment, the battery box 1 is made of polycarbonate (PC) or polybutylene terephthalate (PBT).

Further, the bottom cover 2 comprises a bottom plate 21 and a side wall 22 extending from an edge of the bottom plate 21 towards the battery box 1, and the bottom cover 2 is used to cover one end of the battery box 1 through an opening formed. Specifically, the bottom cover 2 is connected with the second end of the battery box 1 through the side wall 22 to form a second accommodating cavity b in coordination with the battery box 1. It should be noted that the bottom plate 21 is provided with an air inlet 23, that is, the air inlet 23 is communicated with the second accommodating cavity b. In this way, after entering the second accommodating cavity b from the air inlet 23, the air can enter the first accommodating cavity a through the first through hole 12 at the second end of the battery box 1, and then be discharged through the air outlet 11 at the first end of the battery box 1. In an optional embodiment, the bottom cover 2 is made of polycarbonate (PC) or polybutylene terephthalate (PBT).

Figure 9:
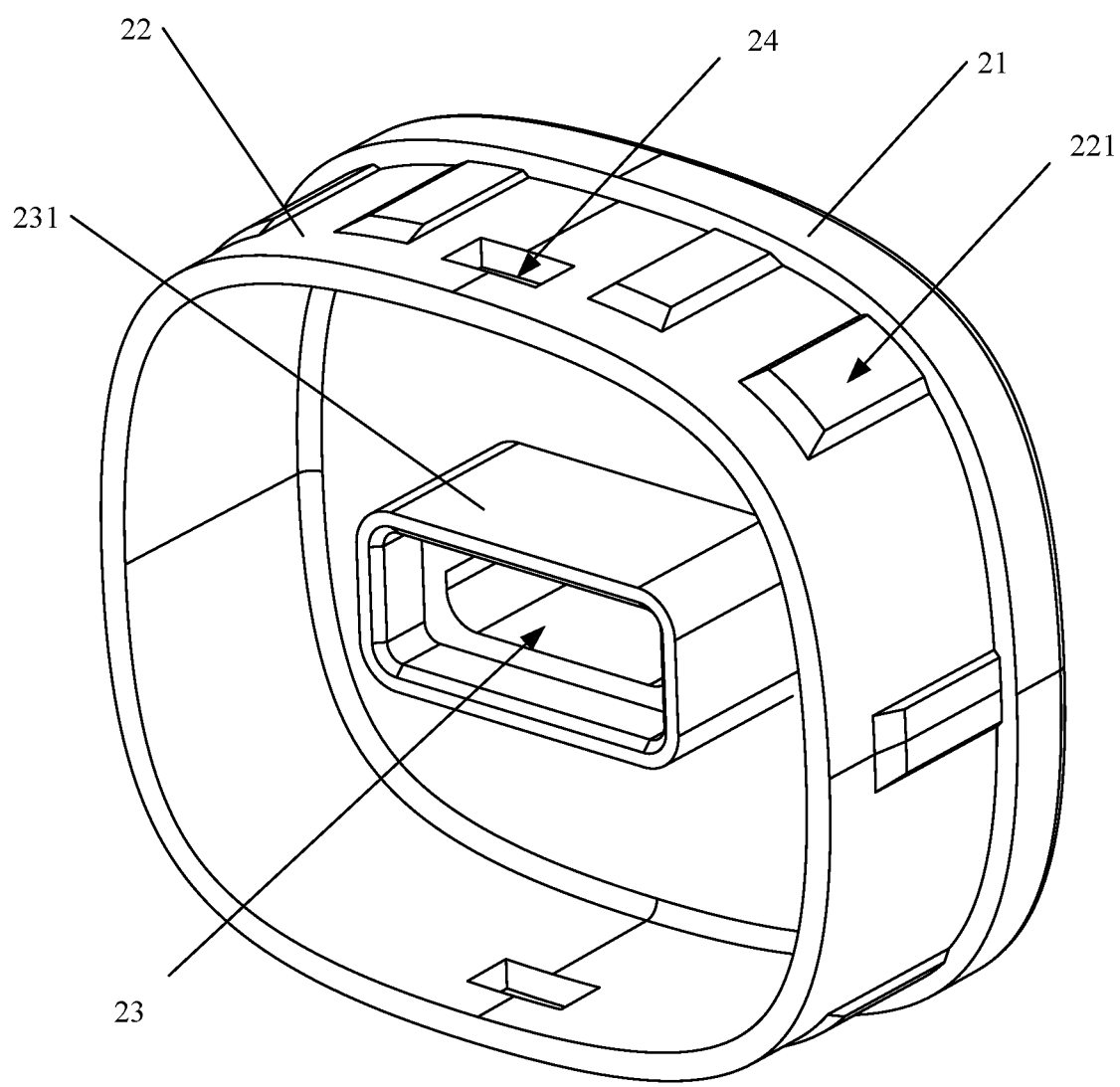
FIG. 9 is a structural diagram of a bottom cover according to embodiments of the present disclosure.
Figure 10:
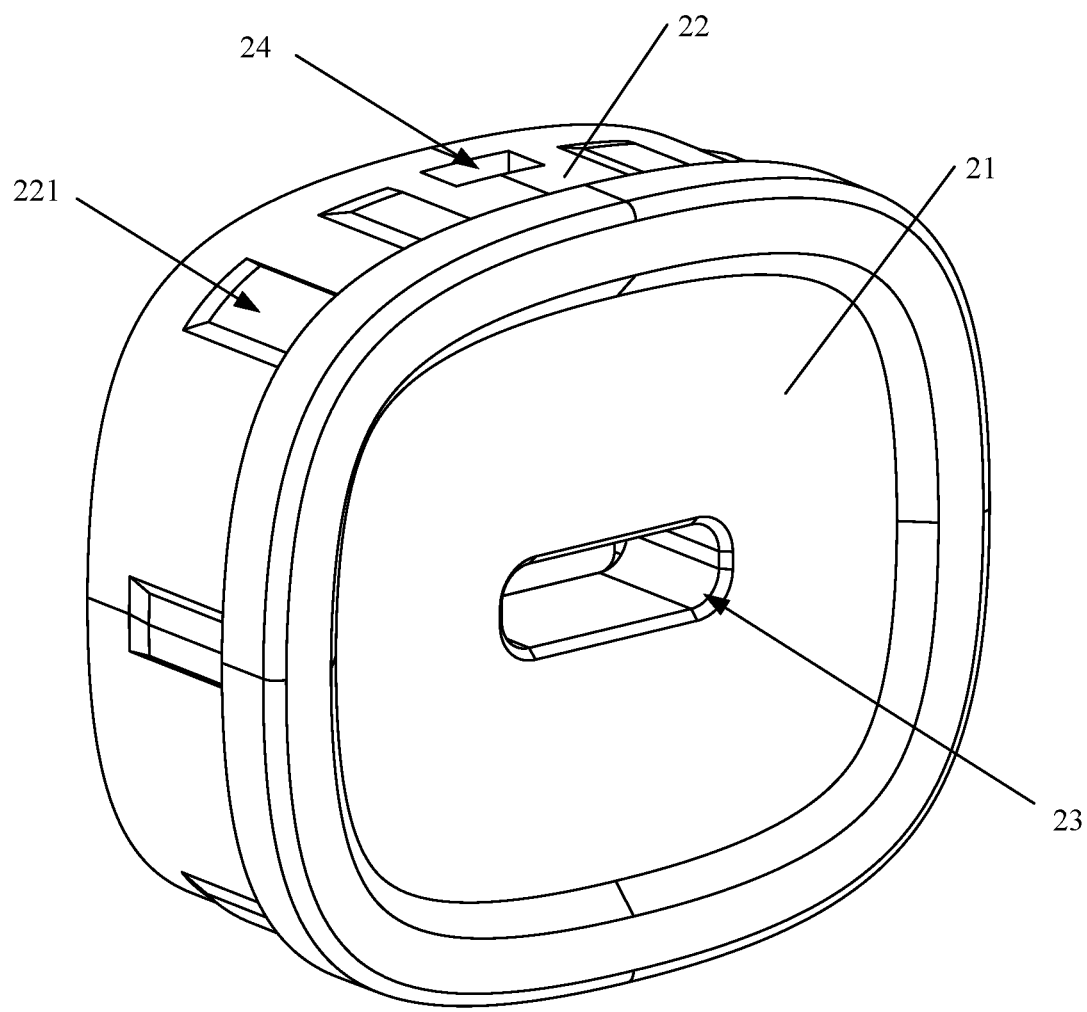
FIG. 10 is a structural diagram of the bottom cover from another angle of view according to embodiments of the present disclosure.

As shown in FIGS. 9 to 10, in an embodiment, a buckle hole 24 is arranged on a side wall 22 of the bottom cover 2. Further, the second end of the battery box 1 is provided with a third buckle 19 matched with the buckle hole 24, and the third buckle 19 fixes the bottom cover 2 through the buckle hole 24. It should be noted that the bottom cover 2 is fixed by buckling, which is convenient for maintenance and replacement, simplifies the installation steps and helps to realize assembly automation.

It should be noted that the first end of the battery box 1 is used for being connected to the atomizer A, and the atomizer A has a through channel so that air can flow in the atomizer A. Therefore, when the electronic cigarette stem B is communicated with the atomizer A, the air inlet 23, the second accommodating cavity b, the first through hole 12, the first accommodating cavity a and the air outlet 11 form an airflow channel in communication with the atomizer A, that is, the electronic cigarette sucks air through the air inlet 23 on the electronic cigarette stem B.

Figure 11:
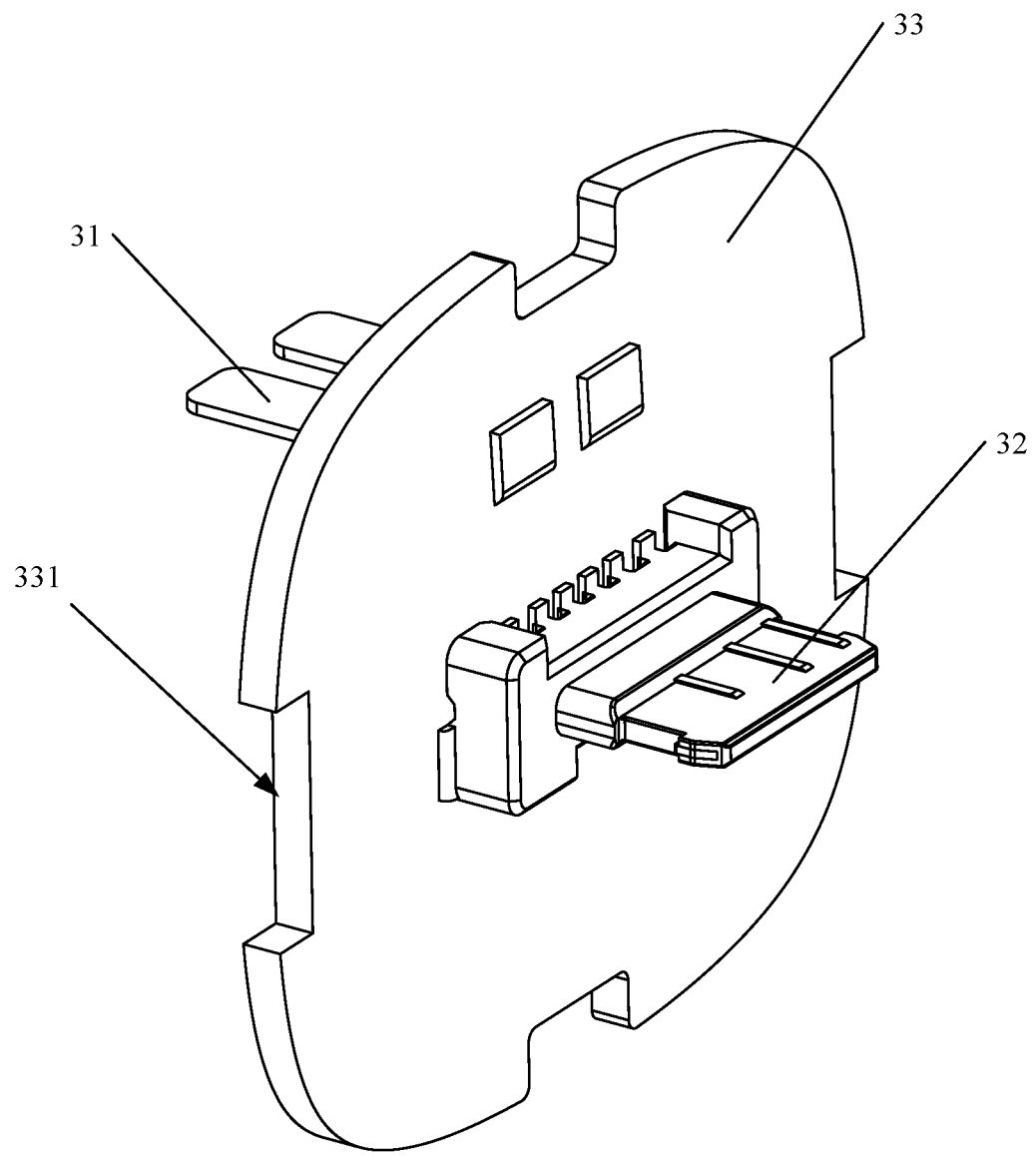
FIG. 11 is a structural diagram of a charging connection module according to embodiments of the present disclosure.

Further, FIG. 11 is a structural diagram of the charging connection module 3 according to embodiments of the present disclosure; as shown in FIG. 11, the charging connection module 3 is arranged in the second accommodating cavity b. It should be noted that an output terminal 31 of the charging connection module 3 extends into the first accommodating cavity a through the first through hole 12 to be connected to the battery 4 in the first accommodating cavity a for charging. Meanwhile, an input terminal 32 of the charging connection module 3 is configured to be connected to an external power supply through the air inlet 23. It should be noted that an outer circumferential side of the input terminal 32 is partly or entirely spaced from an inside wall of the air inlet 23, and the space is used for access of the outside air. In other words, an external power supply may be inserted into the air inlet 23 and connected to the input terminal 32 of the charging connection module 3 to realize charging of the battery 4 in the first accommodating cavity a. Therefore, the electronic cigarette stem B according to the embodiment realizes that the air inlet 23 is used for both ventilation and charging, so that there is no need to provide different ports on the electronic cigarette stem B for different purposes, which not only makes full use of the charging structure of the electronic cigarette stem B, but also improves the production efficiency and reduces the production cost by simplifying the structure.

In an implementation, the bottom plate 21 extends towards the battery box 1 from an edge of the air inlet 23 to form an inlet channel 231, and the input terminal 32 is located in the inlet channel 231. It should be noted that the input terminal 32 is configured to comply with a scheduled charging protocol, and the inlet channel 231 is formed as a charging port that matches the scheduled charging protocol. It should be further explained that the scheduled charging protocol includes but is not limited to a PD fast charge protocol, a QC fast charge protocol, and the like. As an optional embodiment, the input terminal 32 complies with the PD fast charge protocol and the inlet channel 231 is formed as a Type-C interface that mutually matches the PD fast charge protocol.

Figure 12:
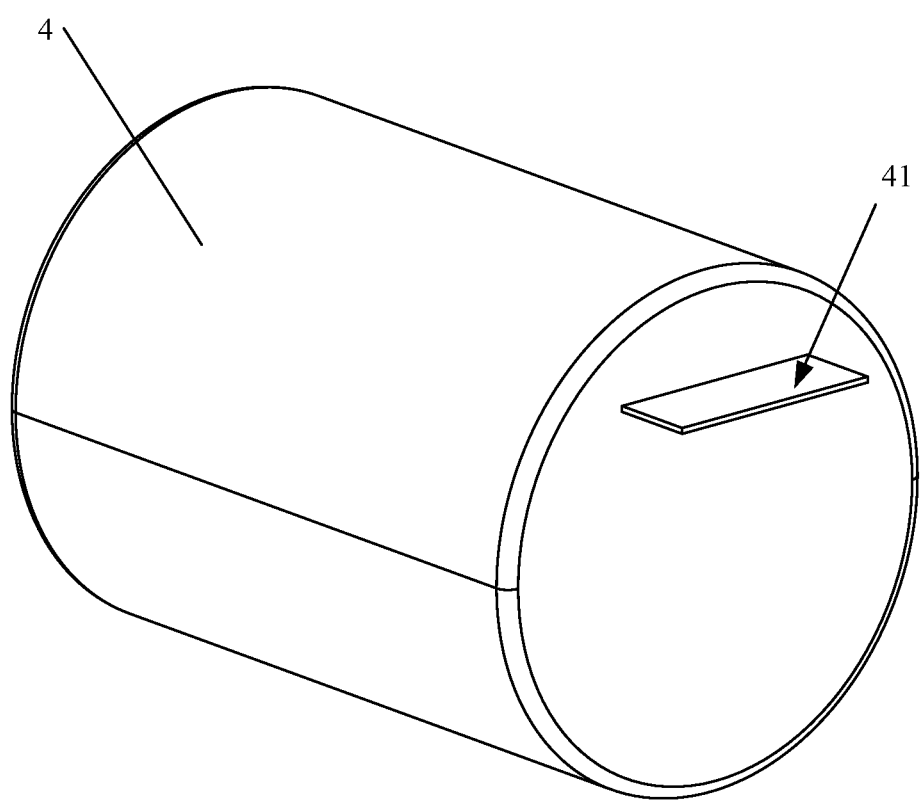
FIG. 12 is a structural diagram of a battery according to embodiments of the present disclosure.
Figure 13:
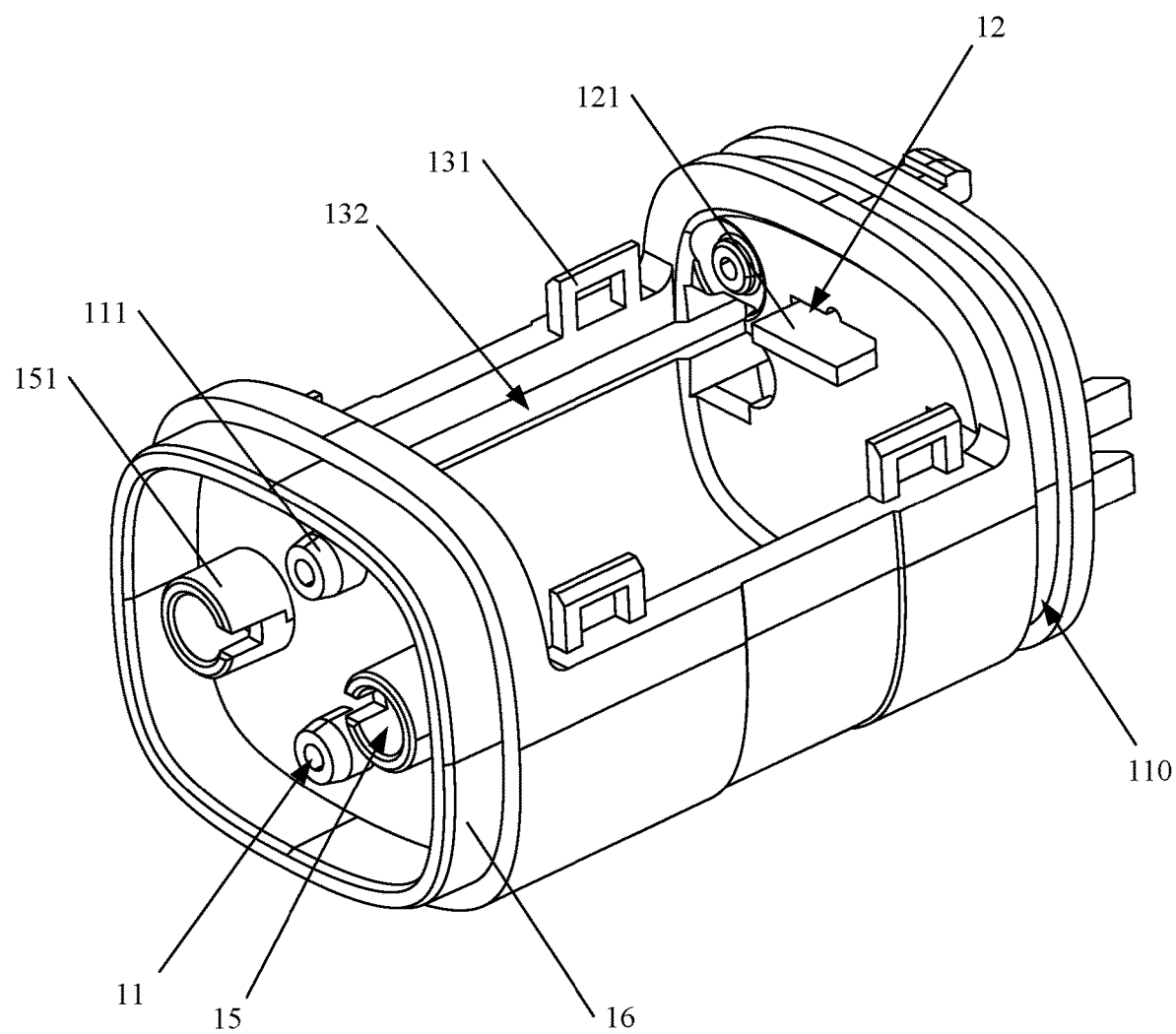
FIG. 13 is a structural diagram of a battery box body according to embodiments of the present disclosure.
Figure 14:
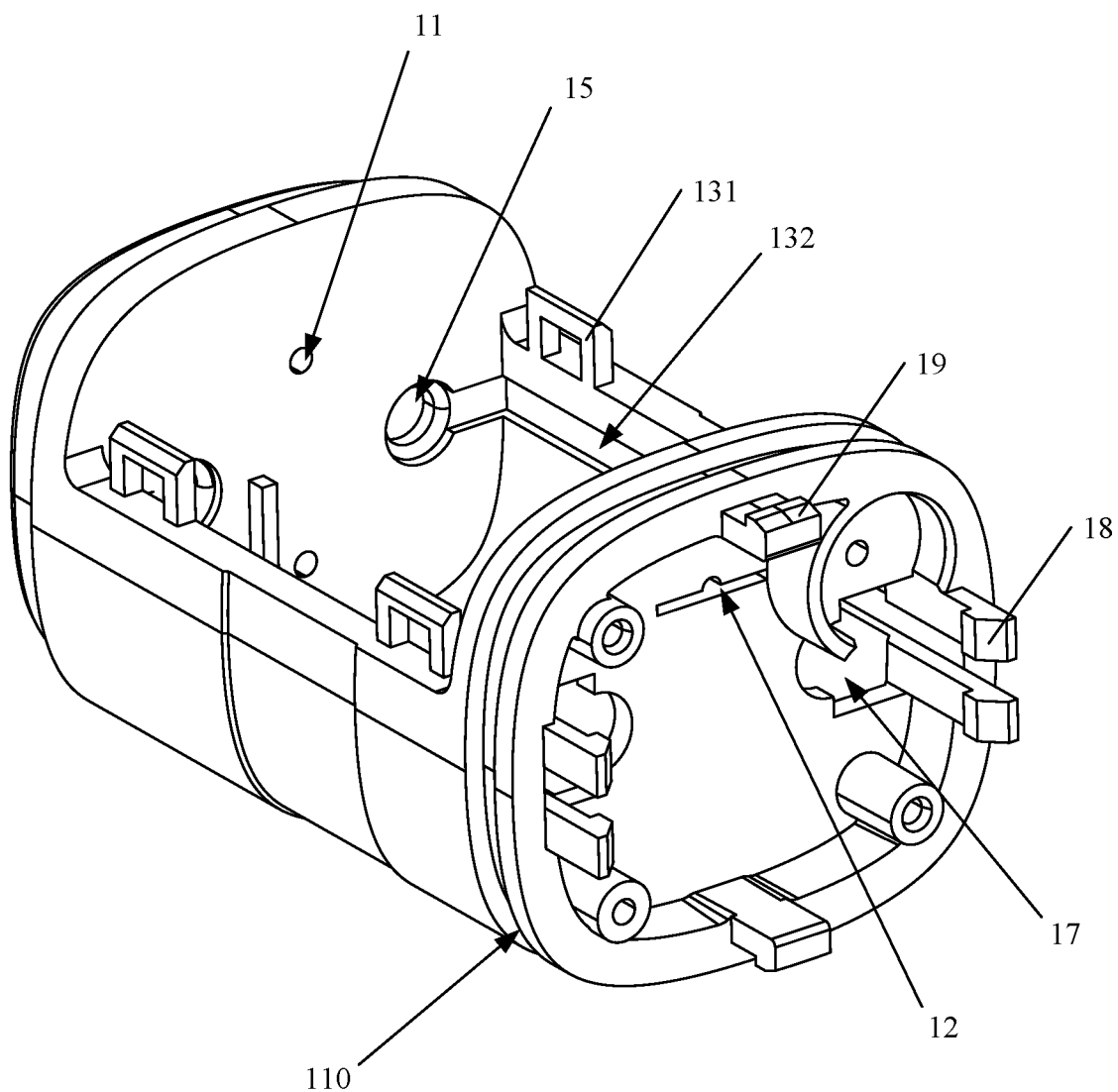
FIG. 14 is a structural diagram of the battery box body from another angle of view according to embodiments of the present disclosure.
Figure 15:
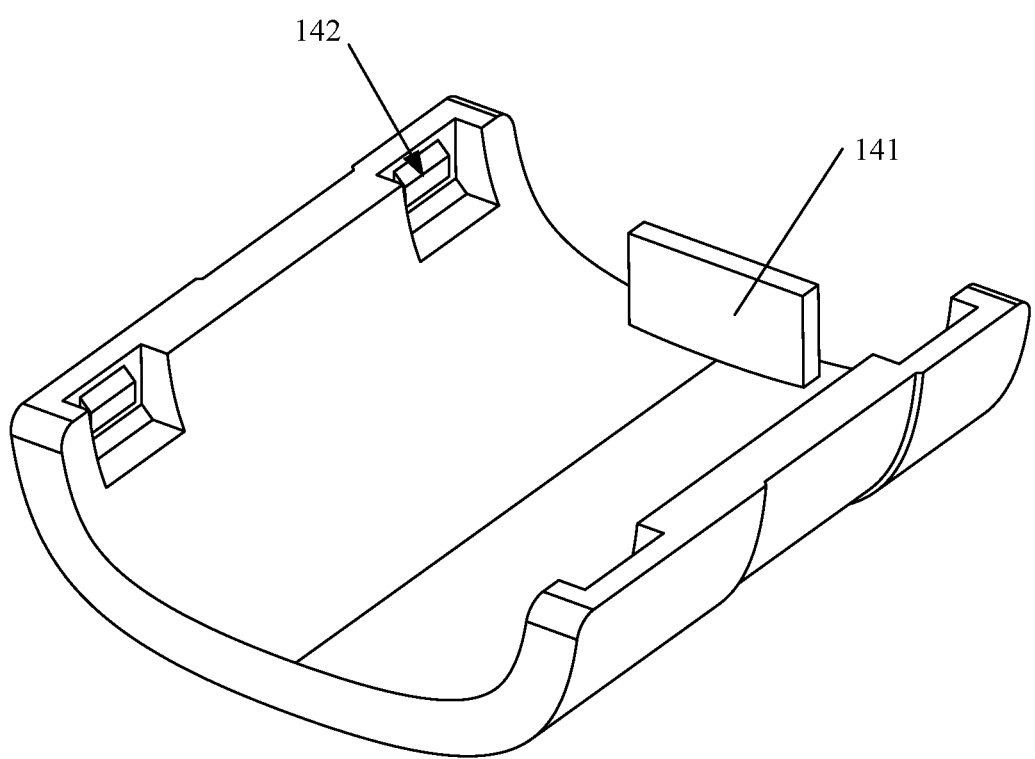
FIG. 15 is a structural diagram of a battery cover according to embodiments of the present disclosure.
Figure 16:
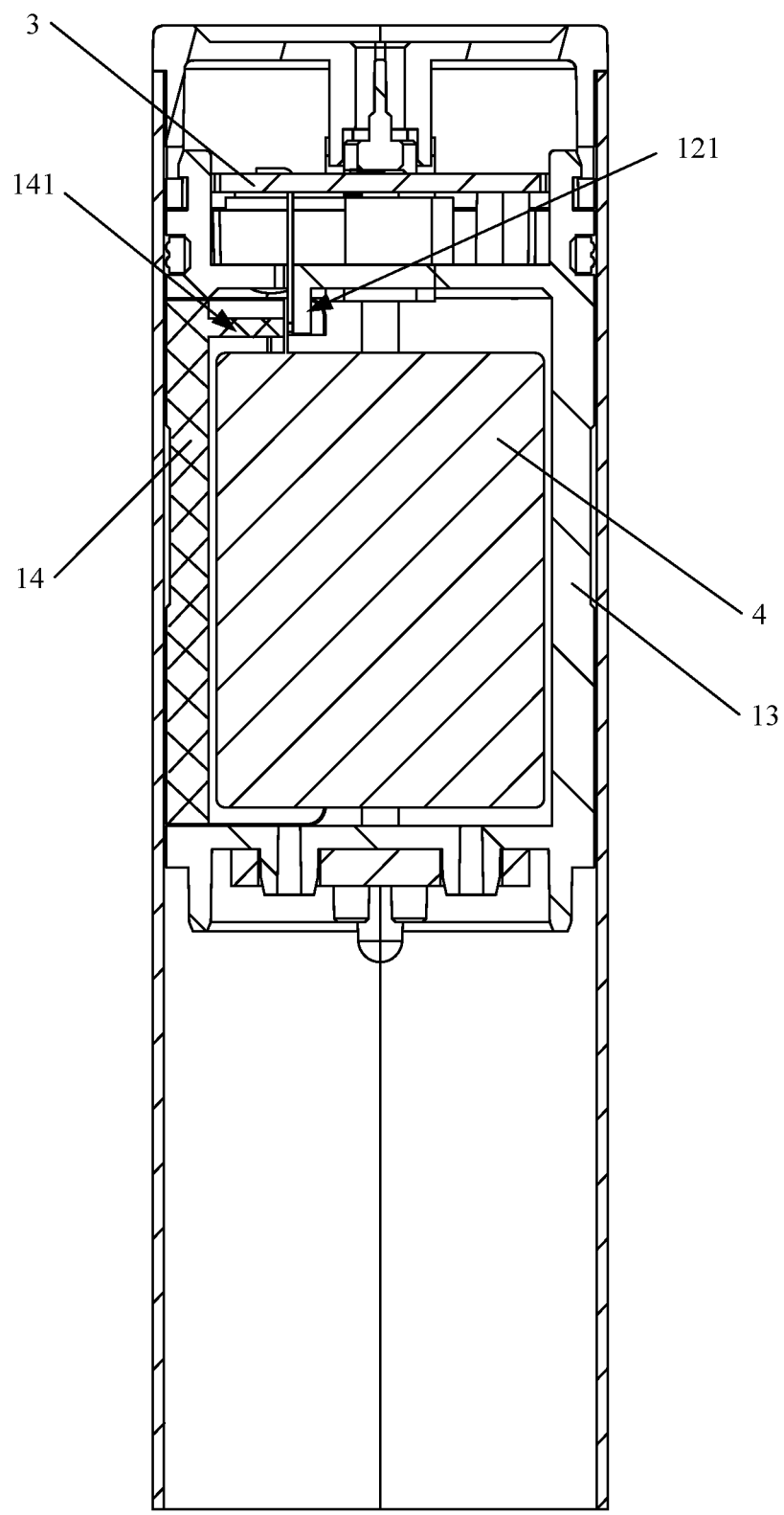
FIG. 16 is a sectional diagram of an installation structure of the battery cover according to embodiments of the present disclosure.

FIG. 12 is a structural diagram of the battery 4 according to embodiments of the present disclosure; as shown in FIG. 12, in an embodiment, the electronic cigarette stem B further comprises the battery 4. The battery 4 includes but is not limited to a rechargeable and dischargeable battery such as a lithium battery and a nickel-chromium battery, and the battery 4 is arranged in the first accommodating cavity a. It should be noted that the size of the first accommodating cavity a is large, so as to ensure that sufficient airflow space remains after the battery 4 is put in. In this way, the air sucked in from the air inlet 23 can be discharged from the air outlet 11. Further, the output terminal 31 of the charging connection module 3 is connected with the battery 4 through the first through hole 12. It should be noted that the shape of the first through hole 12 is matched with the output terminal 31, and the size of the first through hole 12 is slightly larger than that of the output terminal 31. As an optional embodiment, the first through hole 12 may be recessed outward from an edge to increase the size of the first through hole 12, so as to facilitate air flow.

In an embodiment, one end of the battery 4 facing the bottom cover 2 is provided with a tab 41 extending therefrom, and the tab 41 is used to lead a cathode and an anode from a core of the battery 4 to a specific location. Specifically, the tab 41 is provided as a metal conductor, and an electrode is provided on the tab 41. In the embodiment, the tab 41 is set directly opposite the first through hole 12, and the output terminal 31 of the charging connection module 3 is connected with the electrode through the first through hole 12, so that the input terminal 32 can charge the battery 4 after connecting to the external power supply.

In an embodiment, the first through hole 12 extends from an edge towards the first end of the battery box 1 to form a supporting portion 121, and the size of the supporting portion 121 is matched with the output terminal 31. In the embodiment, the output terminal 31 and the tab 41 are stacked on the supporting portion 121. Specifically, when the output terminal 31 extends into the first accommodating cavity a from the first through hole 12, it is positioned on the supporting portion 121, and then the battery 4 is placed into the first accommodating cavity a, so that the tab 41 can be overlapped on the output terminal 31. It should be noted that a side of the tab 41 having the electrode faces the output terminal 31, so that the output terminal 31 can be connected with the electrode.

As shown in FIGS. 13 to 16, in one embodiment, the battery box 1 comprises a battery box body 13 and a battery cover 14. There is an opening at a side of the battery box body 13 and the battery cover 14 is matched with the opening. Further, a pressing portion 141 is arranged on a side of the battery cover 14 facing the battery 4. In the embodiment, the battery cover 14 is configured to close the first accommodating cavity a and presses the tab 41 and the output terminal 31 on the supporting portion 121 through the pressing portion 141. That is, when the battery cover 14 closes the opening on the side of the battery box body 13, the pressing portion 141 presses the tab 41 of the battery 4, thereby ensuring that the tab 41 can be brought into contact with the output terminal 31 with the cooperation of the supporting portion 121, thus avoiding poor contact.

In an embodiment, the battery box body 13 is provided with a buckle ring 131, and the battery cover 14 is provided with a first buckle 142 mutually matched with the buckle ring 131. In the embodiment, the battery cover 14 is fixedly connected with the battery box body 13 through the first buckle 142 and the buckle ring 131. Therefore, the battery box body 13 and the battery 14 are fixed by means of buckling, which is convenient for subsequent maintenance, simplifies the production and assembly processes, and contributes to automation. It is easy to understand that a buckle may also be provided on the battery cover 14 and a corresponding buckle ring may be provided on the battery box body 13.

Figure 17:
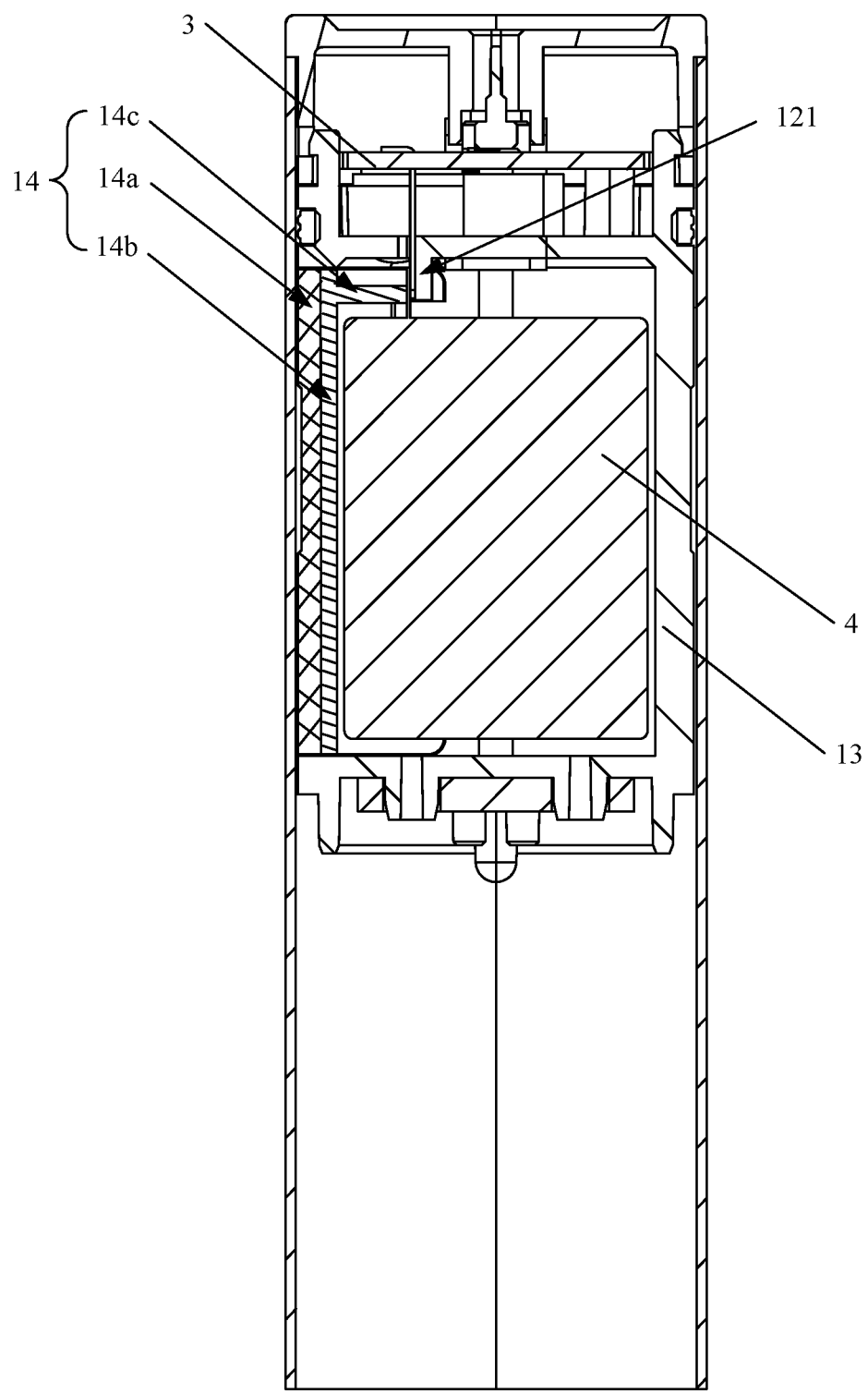
FIG. 17 is a sectional diagram of an installation structure of another battery cover according to embodiments of the present disclosure.

As shown in FIG. 17, in an optional embodiment, the battery cover 14 comprises a cover body 14a and a pressing member 14b. The cover body 14a is mutually matched with the opening on the side of the battery box body 13 and is used to close the first accommodating cavity a. An abutting portion 14c is formed on a side of the pressing member 14b facing the battery 4, so as to press the tab 41 and the output terminal 31 on the supporting portion 121. In the embodiment, after the battery 4 is placed in the first accommodating cavity a, the pressing member 14b is first placed aligned with the tab 41, and then the opening on the side of the battery box body 13 is closed by the cover body 14a, and the pressing member 14b is pressed at the same time to indirectly press the tab 41 and the output terminal 31, so as to ensure the reliability of contact between the two. Pressing the pressing member 14b helps to determine a structure of the pressing member 14b according to actual needs, avoid designing and manufacturing the cover body 14a, and is also beneficial to repair and replace the pressing member 14b.

Figure 18:
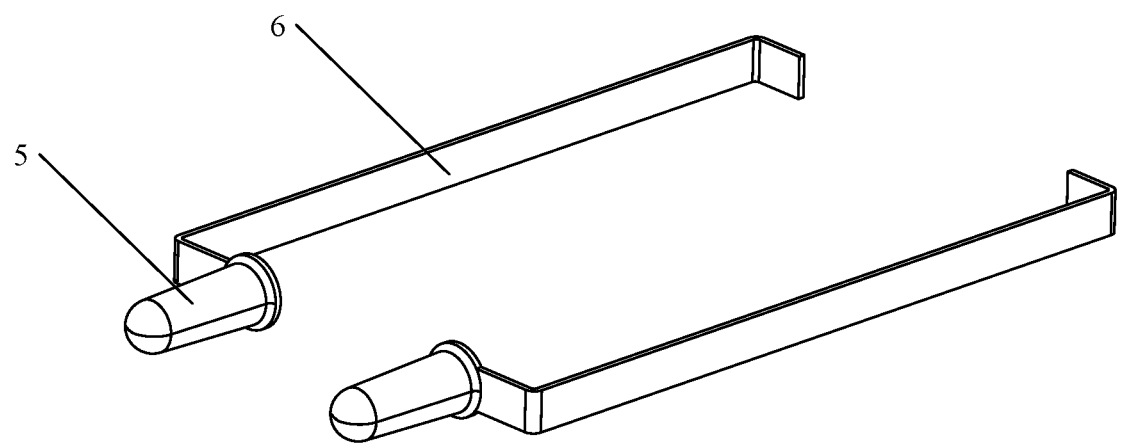
FIG. 18 is a structural diagram of a power supply terminal and an electrical connector according to embodiments of the present disclosure.

As shown in FIG. 18, in an embodiment, the electronic cigarette stem B further comprises power supply terminals 5 and electrical connectors 6. Each of the power supply terminals 5 protrudes from the first end of the battery box 1, and both ends of each of the electrical connectors 6 are respectively connected with the respective power supply terminal 5 and the charging connection module 3. In the embodiment, each of the power supply terminals 5 is made of pure copper, phosphor copper or other conductive materials for supplying electric energy stored in the battery 4 to the atomizer A. In this way, the electronic cigarette stem B can be connected with the external power supply through the air inlet 23 to charge the battery 4. When the user uses the electronic cigarette, the electronic cigarette stem B provides electric energy through the respective power supply terminal 5 connected to the terminal of the atomizer A, so that the tar stored in the atomizer A can be atomized for the user to smoke.

In an embodiment, each of the electrical connectors 6 is a metal sheet made of pure copper, phosphor copper or other conductive materials. It is easy to understand that the metal sheet has good ductility and conductivity; meanwhile, the sheet-shaped structure has high strength, which is convenient for maintenance and replacement, and is convenient for each of the electrical connectors 6 fixed with the each of the power supply terminals 5 to be inserted into the first accommodating cavity a from the second end of the battery box 1, and for pushing each of the power supply terminals 5 out of the first end of the battery box 1. In the embodiment, an inner wall of the battery box body 13 is provided with a slot 132 connecting with second through holes 15, and the size of the slot 132 is matched with that of the metal sheet, so that the metal sheet is inserted into the first accommodating cavity a through the slot 132. It is easy to understand that the slot 132 is used for limiting and directing the metal sheet. As an optional embodiment, each of the electrical connectors 6 may be provided as a wire made of copper or other conductive materials.

In an embodiment, the first end of the battery box 1 is provided with second through holes 15, and each of the power supply terminals 5 protrudes from the first end of the battery box 1 through the respective second through hole 15. Further, each of the second through holes 15 extends from an edge in a direction away from the bottom cover 2 to form a terminal channel 151. It should be noted that the terminal channel 151 can be used for limiting and directing each of the power supply terminals 5. In the embodiment, the air outlet 11 extends from an edge in a direction away from the bottom cover 2 to form an outlet channel 111. Therefore, the terminal channel 151 and the outlet channel 111 are protruded with respect to the first end of the battery box 1, which facilitates the electronic cigarette stem B to be connected with the atomizer A.

Figure 19:
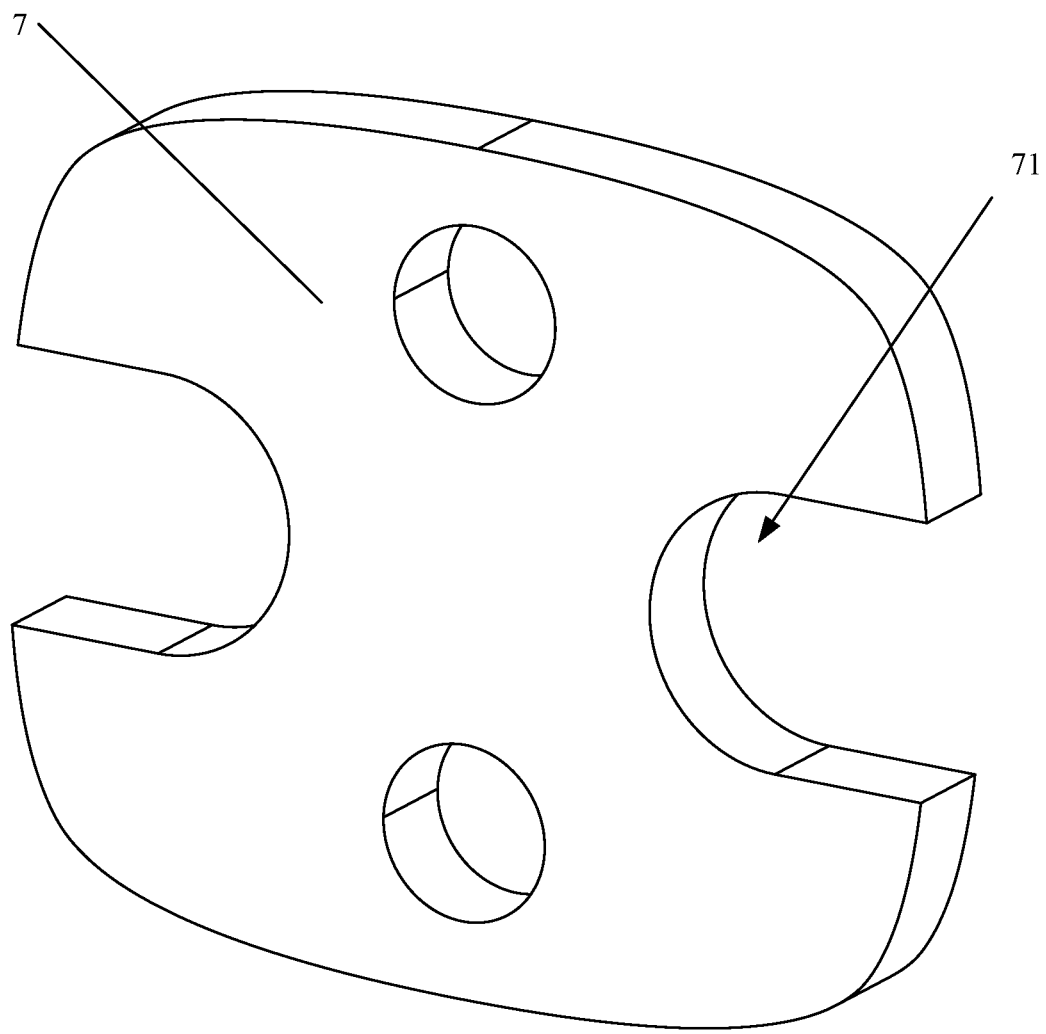
FIG. 19 is a structural diagram of a tar-absorbing cotton according to embodiments of the present disclosure.

In an embodiment, the first end of the battery box 1 bulges in a direction away from the bottom cover 2 to form an annular limiting portion 16. Further, the limiting portion 16 is arranged around the terminal channel 151 and the outlet channel 111. It should be noted that providing the protruding limiting portion 16 is favorable for the connection between the electronic cigarette stem B and the atomizer A. As shown in FIG. 19, in an embodiment, the electronic cigarette stem B further comprises a tar-absorbing cotton 7. The tar-absorbing cotton 7 is made of a fibrous material having an adsorptive effect and is used for preventing tar from leaking from the atomizer A and entering the battery box 1 by the adsorptive effect. It should be noted that the tar-absorbing cotton 7 is arranged inside the limiting portion 16 and provided with an avoiding structure 71. It is easy to understand that the avoiding structure 71 comprises avoiding grooves and/or avoiding holes, and the terminal channel 151 and the outlet channel 111 pass through the tar-absorbing cotton 7 through the avoiding structure 71. It should be noted that the protruding terminal channel 151 and the outlet channel 111 help prevent tar from entering the battery box 1 from the air outlet 11 and the respective second through hole 15.

Figure 20:
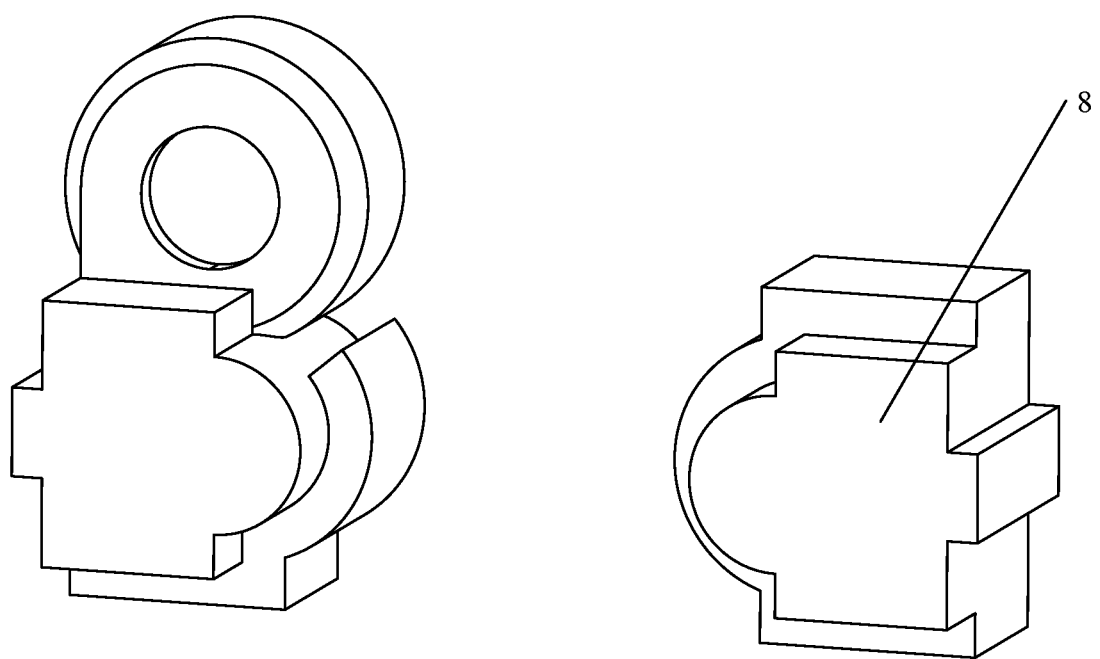
FIG. 20 is a structural diagram of a leak-proof plug according to embodiments of the present disclosure.

As shown in FIG. 20, in an embodiment, the electronic cigarette stem B further comprises leak-proof plugs 8. Each of the leak-proof plugs 8 is made of silicone and is used to prevent tar leakage. Each of the leak-proof plugs 8 is arranged at an end of the respective electrical connectors 6 close to the bottom cover 2. Further, the second end of the battery box 1 is provided with third through holes 17, and each of the electrical connectors 6 is connected with the charging connection module 3 through the respective third through hole 17. In the embodiment, each of the leak-proof plugs 8 is used for plugging the respective third through hole 17. It should be noted that in the embodiment, there are two power supply terminals 5, and two electrical connectors 6, two second through holes 15, two third through holes 17, and two leak-proof plugs 8. It should be further explained that the shape and size of a part where each of the leak-proof plugs 8 is inserted into the respective third through hole 17 are matched with that of the respective third through hole 17 to ensure the leak-proof effect. The size of a part of each of the leak-proof plugs 8 not inserted into the respective third through hole 17 is larger than that of the respective third through hole 17, so as to perform the limiting function in the installation of each of the leak-proof plugs 8.

In an embodiment, the charging connection module 3 also includes a circuit board 33. The circuit board 33 is arranged in the second accommodating cavity b. Further, the input terminal 32 and the output terminal 31 are arranged on the circuit board 33. It should be noted that one end of each of the electrical connectors 6 is provided on the circuit board 33, and the charging connection module 3 controls the charging and discharging of the battery 4.

In an embodiment, the circuit board 33 is sunken from edges to form clamping grooves 331. Further, the second end of the battery box 1 is provided with a second buckle 18, and the second buckle 18 fixes the circuit board 33 through the clamping groove 331. It should be noted that the circuit board 33 is installed by buckling, which is convenient for maintenance and replacement, simplifies the installation steps and helps to realize assembly automation.

Figure 21:
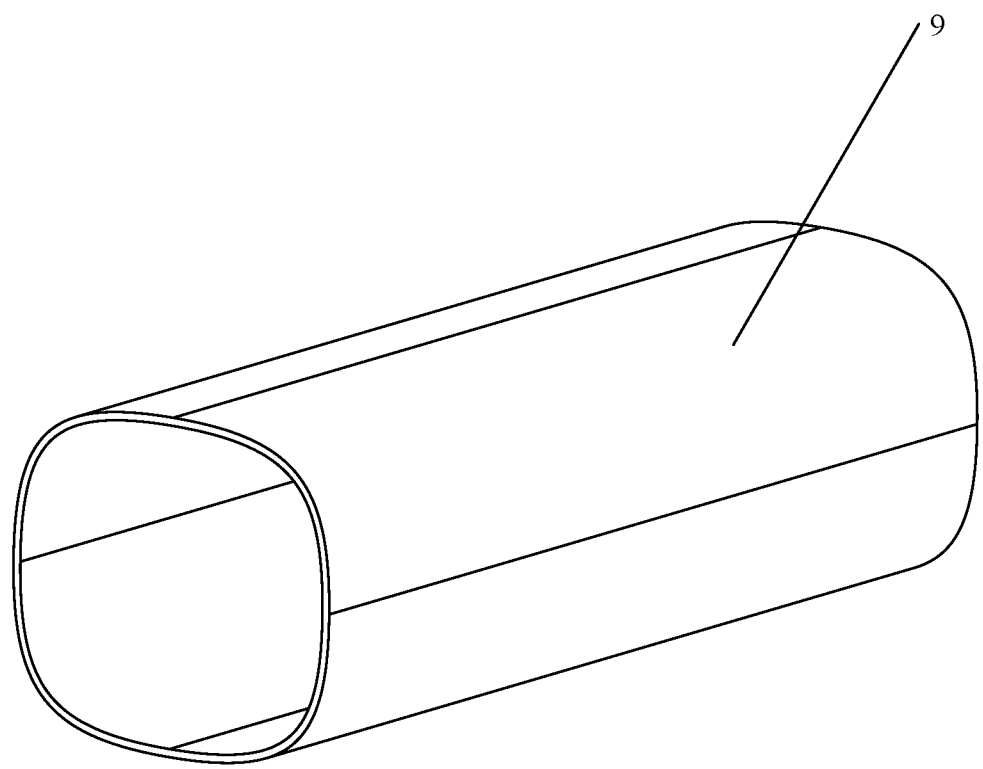
FIG. 21 is a structural diagram of an outer shell according to embodiments of the present disclosure.

As shown in FIG. 21, in an embodiment, the electronic cigarette stem B further comprises an outer shell 9. The outer shell 9 is made of aluminum alloy and the surface is anodized or coated. The outer shell 9 is arranged in a tubular structure and sheathed on the battery box 1. Further, a first end of the outer shell 9 extends out of the battery box 1 to form an accommodating space c. It should be noted that the accommodating space c is used for being connected to the atomizer A.

Figure 22:
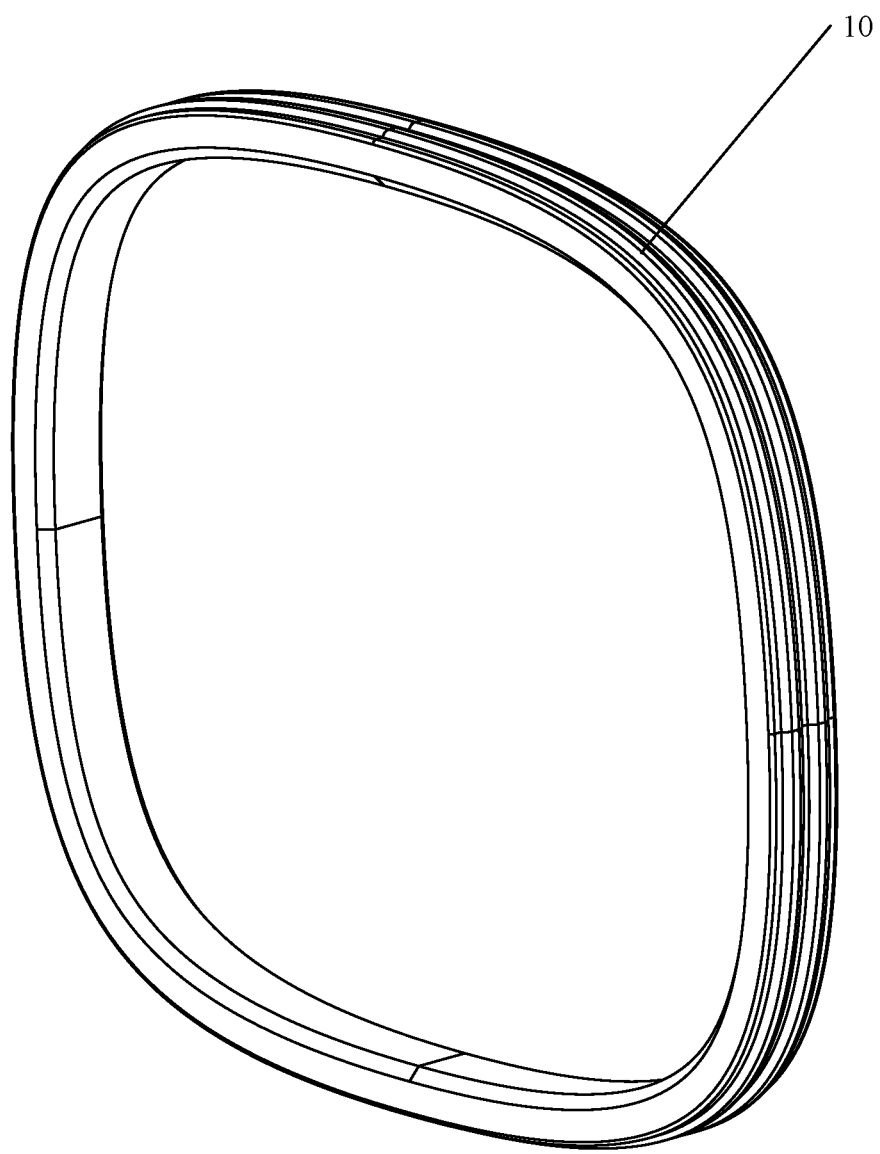
FIG. 22 is a structural diagram of a sealing ring according to embodiments of the present disclosure.

In an embodiment, the side of the battery box 1 is provided with an annular groove 110 along the circumferential direction. Further, as shown in FIG. 22, the electronic cigarette stem B further comprises a sealing ring 10, and the sealing ring 10 is made of silicone. It should be noted that the sealing ring 10 is sleeved in the annular groove 110 and connects an inner wall of the outer shell 9. Therefore, the sealing ring 10 can not only prevent leakage, but also tighten the outer shell 9; meanwhile, when the user smokes, the first accommodating cavity a in the electronic cigarette stem B forms a stable negative pressure state relative to the outside, so that the outside air can flow stably to the first accommodating cavity a and further flow to the outlet channel 111.

In an embodiment, a size of the bottom plate 21 of the bottom cover 2 is larger than an inner size of the outer shell 9, and a size of the side wall 22 of the bottom cover 2 is smaller than the inner size of the outer shell 9. Therefore, when the outer shell 9 is mounted, one end of the outer shell 9 is sheathed on the side wall 22 of the bottom cover 2, and an end face of the outer shell 9 is brought into contact with the bottom plate 21 of the bottom cover 2. That is, the bottom plate 21 can limit the position of the outer shell 9.

In an embodiment, part of the side wall 22 of the bottom cover 2 bulges to form a contact portion 221. In the embodiment, the side wall 22 contacts the inner wall of the outer shell 9 through the contact portion 221. Therefore, when the end of the outer shell 9 is sheathed on the side wall 22, the contact portion 221 acts as a fastener to the outer shell 9.

The embodiments of the present disclosure further provide an electronic cigarette, wherein the electronic cigarette comprises the electronic cigarette stem B and the atomizer A. The structural features of the electronic cigarette stem B are as described above and will not be described herein. For the electronic cigarette according to the embodiment, the air inlet 23 of the electronic cigarette stem B can be used for both ventilation and charging the battery 4. When the atomizer A is connected with the electronic cigarette stem B, each of the power supply terminals 5 of the electronic cigarette stem B is connected with the corresponding terminal A1 of the atomizer A, so that the battery 4 in the electronic cigarette stem B is electrically connected with the atomizing core A2 in the atomizer A, and the heating atomization effect of the atomizing core A2 on the tar is realized. In this way, the user can conveniently suck the atomized tar. In addition, the airflow channel formed by the electronic cigarette stem B can supply air to the atomizer A.

Provided by the embodiments of the present disclosure is an electronic cigarette stem and an electronic cigarette, wherein the electronic cigarette stem comprises a battery box, a bottom cover and a charging connection module. A first accommodating cavity is formed inside the battery box, and both ends of the battery box are respectively provided with an air outlet and a first through hole. The bottom cover comprises a bottom plate and a side wall, and forms a second accommodating cavity in coordination with the battery box. The charging connection module is arranged in the second accommodating cavity, and an output terminal is arranged in the first accommodating cavity through the first through hole, and an input terminal is configured to be connected to an external power supply through an air inlet. The air inlet, the second accommodating cavity, the first through hole, the first accommodating cavity and the air outlet thereby form an airflow channel in communication with an atomizer. In addition, using the air inlet for both air admission and charging can simplify a structure of the electronic cigarette stem, which helps to improve the production efficiency and reduce the production cost.

The above-mentioned embodiments are only preferred embodiments of the present disclosure and are not intended to limit the present disclosure. The present disclosure may be subject to various modifications and variations to those skilled in the art. Any modifications, equivalent substitutions or improvements that are within the spirit and principle of the disclosure are intended to be covered by the protection scope of the disclosure.

The invention claimed is:

1. An electronic cigarette stem, wherein the electronic cigarette stem (B) comprises:
a battery box (1), wherein a first accommodating cavity (a) is formed inside the battery box (1), and a first end of the battery box (1) is provided with an air outlet (11) communicated with the first accommodating cavity (a), and a second end of the battery box (1) is provided with a first through hole (12) communicated with the first accommodating cavity (a);
a bottom cover (2), wherein the bottom cover (2) comprises a bottom plate (21) and a side wall (22) extending from an edge of the bottom plate (21) towards the battery box (1), and the bottom plate (21) is provided with an air inlet (23), and the bottom cover (2) is connected with the second end of the battery box (1) through the side wall (22) to form a second accommodating cavity (b) in coordination with the battery box (1); and
a charging connection module (3) is arranged in the second accommodating cavity (b), and an output terminal (31) of the charging connection module (3) extends into the first accommodating cavity (a) through the first through hole (12), and an input terminal (32) of the charging connection module (3) is configured to be connected to an external power supply through the air inlet (23), wherein an outer circumferential side of the input terminal (32) is partly or entirely spaced from an inside wall of the air inlet (23);
and wherein the first end of the battery box (1) is used for being connected to an atomizer (A), and the air inlet (23), the second accommodating cavity (b), the first through hole (12), the first accommodating cavity (a) and the air outlet (11) form an airflow channel in communication with the atomizer (A);
wherein the bottom plate (21) extends towards the battery box (1) from an edge of the air inlet (23) to form an inlet channel (231);
and the input terminal (32) is located in the inlet channel (231).

2. The electronic cigarette stem according to claim 1, wherein the electronic cigarette stem (B) further comprises:
a battery (4) arranged in the first accommodating cavity (a);
and wherein the output terminal (31) of the charging connection module (3) is connected with the battery (4) through the first through hole (12).

3. The electronic cigarette stem according to claim 2, wherein one end of the battery (4) facing the bottom cover (2) is provided with a tab (41) extending therefrom, and an electrode is arranged on the tab (41);
and the output terminal (31) of the charging connection module (3) is connected with the electrode through the first through hole (12).

4. The electronic cigarette stem according to claim 3, wherein the first through hole (12) extends from an edge towards the first end of the battery box (1) to form a supporting portion (121);
and the output terminal (31) and the tab (41) are stacked on the supporting portion (121).

5. The electronic cigarette stem according to claim 4, wherein the battery box (1) comprises:
a battery box body (13), wherein there is an opening at a side of the battery box body (13); and
a battery cover (14), wherein the battery cover (14) is matched with the opening, and a pressing portion (141) is arranged on a side of the battery cover (14) facing the battery (4), and the battery cover (14) is configured to close the first accommodating cavity (a) and presses the tab (41) and the output terminal (31) on the supporting portion (121) through the pressing portion (141).

6. The electronic cigarette stem according to claim 5, wherein the battery box body (13) is provided with a buckle ring (131);

the battery cover (14) is provided with a first buckle (142) mutually matched with the buckle ring (131), and the battery cover (14) is fixedly connected with the battery box body (13) through the first buckle (142) and the buckle ring (131).

7. The electronic cigarette stem according to claim 5, wherein the battery cover (14) comprises a cover body (14a) and a pressing member (14b), and the cover body (14a) is mutually matched with the opening on the side of the battery box body (13) and is configured to close the first accommodating cavity (a), and an abutting portion (14c) is arranged on a side of the pressing member (14b) facing the battery (4), and the abutting portion (14c) is configured to press the tab (41) and the output terminal (31) on the supporting portion (121).

8. The electronic cigarette stem according to claim 2, wherein the electronic cigarette stem (B) further comprises:
power supply terminals (5), wherein each of the power supply terminals (5) protrudes from the first end of the battery box (1), and each of the power supply terminals (5) is used for supplying electric energy stored in the battery (4) to the atomizer (A); and
electrical connectors (6), wherein both ends of each of the electrical connectors (6) are respectively connected with the power supply terminals (5) and the charging connection module (3).

9. The electronic cigarette stem according to claim 8, wherein each of the electrical connectors (6) is arranged as a metal sheet.

10. The electronic cigarette stem according to claim 8, wherein the first end of the battery box (1) is provided with second through holes (15), and each of the power supply terminals (5) protrudes from the first end of the battery box (1) through a respective second through hole (15);
each of the second through holes (15) extends from an edge in a direction away from the bottom cover (2) to form a terminal channel (151);
and the air outlet (11) extends from an edge in a direction away from the bottom cover (2) to form an outlet channel (111).

11. The electronic cigarette stem according to claim 10, wherein the first end of the battery box (1) bulges in a direction away from the bottom cover (2) to form an annular limiting portion (16), and the limiting portion (16) is arranged around the terminal channel (151) and the outlet channel (111);
and wherein the electronic cigarette stem (B) further comprises:
a tar-absorbing cotton (7), wherein the tar-absorbing cotton (7) is arranged inside the limiting portion (16) and provided with an avoiding hole (71);
and the terminal channel (151) and the outlet channel (111) pass through the tar-absorbing cotton (7) through the avoiding hole (71).

12. The electronic cigarette stem according to claim 8, wherein the electronic cigarette stem (B) further comprises: leak-proof plugs (8) arranged at an end of each of the electrical connectors (6);
and wherein the second end of the battery box (1) is provided with third through holes (17), and each of the electrical connectors (6) is connected with the charging connection module (3) through a respective third through hole (17), and each of the leak-proof plugs (8) is used for plugging the respective third through hole (17).

13. The electronic cigarette stem according to claim 1, wherein the charging connection module (3) further comprises:
a circuit board (33) arranged in the second accommodating cavity (b);
and wherein the input terminal (32) and the output terminal (31) are arranged on the circuit board (33).

14. The electronic cigarette stem according to claim 13, wherein the circuit board (33) is sunken from edges to form clamping grooves (331);
and the second end of the battery box (1) is provided with a second buckle (18), and the second buckle (18) fixes the circuit board (33) through the clamping grooves (331).

15. The electronic cigarette stem according to claim 1, wherein a buckle hole (24) is arranged on the side wall (22) of the bottom cover (2);
the second end of the battery box (1) is provided with a third buckle (19), and the third buckle (19) fixes the bottom cover (2) through the buckle hole (24).

16. The electronic cigarette stem according to claim 1, wherein the electronic cigarette stem (B) further comprises:
an outer shell (9), wherein the outer shell (9) is arranged in a tubular structure and sleeved on the battery box (1), and a first end of the outer shell (9) extends out of the battery box (1) to form an accommodating space (c), and the accommodating space (c) is used for being connected to the atomizer (A).

17. The electronic cigarette stem according to claim 16, wherein a side of the battery box (1) is provided with an annular groove (110) along a circumferential direction;
and wherein the electronic cigarette stem (B) further comprises:
a sealing ring (10), wherein the sealing ring (10) is sleeved in the annular groove (110) and abuts against an inner wall of the outer shell (9).

18. The electronic cigarette stem according to claim 16, wherein a size of the bottom plate (21) of the bottom cover (2) is larger than an inner size of the outer shell (9), and a size of the side wall (22) of the bottom cover (2) is smaller than the inner size of the outer shell (9).

19. An electronic cigarette, wherein the electronic cigarette comprises:
an electronic cigarette stem (B) according to claim 1; and
an atomizer (A) configured to be connected to the electronic cigarette stem (B).

* * * * *